(12) United States Patent
Yasui et al.

(10) Patent No.: US 9,150,252 B2
(45) Date of Patent: Oct. 6, 2015

(54) FRONT-END STRUCTURE FOR VEHICLE

(71) Applicant: HONDA MOTOR CO., LTD., Minato-ku, Tokyo (JP)

(72) Inventors: Ken Yasui, Sakura (JP); Eisei Higuchi, Utsunomiya (JP); Tomoyuki Imanishi, Utsunomiya (JP); Tetsuya Miyahara, Shioya-Gun (JP); Hiroyuki Yoshida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/357,697

(22) PCT Filed: Dec. 14, 2012

(86) PCT No.: PCT/JP2012/082519
§ 371 (c)(1),
(2) Date: May 12, 2014

(87) PCT Pub. No.: WO2013/111475
PCT Pub. Date: Aug. 1, 2013

(65) Prior Publication Data
US 2014/0326526 A1    Nov. 6, 2014

(30) Foreign Application Priority Data

Jan. 25, 2012    (JP) .................................. 2012-013085
Feb. 8, 2012    (JP) .................................. 2012-025027

(51) Int. Cl.
*B62D 21/15*    (2006.01)
*B62D 21/11*    (2006.01)
(Continued)

(52) U.S. Cl.
CPC ................ *B62D 21/155* (2013.01); *B60G 7/02* (2013.01); *B62D 21/11* (2013.01); *B62D 25/082* (2013.01); *B60G 2204/1222* (2013.01); *B60G 2204/143* (2013.01); *B60G 2204/15* (2013.01)

(58) Field of Classification Search
CPC ...... B62D 21/55; B62D 21/11; B62D 25/082; B60G 7/02; B60G 2204/143; B60G 2204/1222; B60G 2204/15

USPC ........... 280/124.109, 784; 180/271, 274, 312; 296/187.09, 193.05
See application file for complete search history.

(56) References Cited

U.S. PATENT DOCUMENTS 5,251,932 A * 10/1993 Ide ................................ 280/784
6,997,276 B2 * 2/2006 Yoshida et al. ............... 180/232
(Continued)

FOREIGN PATENT DOCUMENTS

JP    07-061243 A    3/1995
JP    08-133125 A    5/1996
(Continued)

OTHER PUBLICATIONS

International Search Report from International Application PCT/JP2012/082519 with a mailing date of Mar. 12, 2013 and the English translation thereof. The PCT/ISA/210 with translation was submitted with the application as filed May 12, 2014.
(Continued)

*Primary Examiner* — Ruth Ilan
*Assistant Examiner* — Darlene P Condra
(74) *Attorney, Agent, or Firm* — Carrier Blackman & Associates, P.C.; William D. Blackman; Joseph P. Carrier

(57) ABSTRACT

A front-end structure for a vehicle is provided with: front side frames, a subframe extending across a vehicle body floor front portion to support a suspension component and an electric power steering device, the subframe being supported at least at the front end portion and at the rear end portion and being formed in a subframe main body from a light alloy casting, and a pair of left and right extension arms that are fixed to the subframe main body and extend forward of the subframe main body, and that are formed from a light alloy or steel by press-molding. In the rear portion of the extension arms in the vicinity the subframe main body, provided is a recessed portion that serves as a point at which downward bending starts midway along the lengthwise direction of the subframe with an input load in the event of a vehicle frontal collision.

14 Claims, 37 Drawing Sheets

(51) Int. Cl.
*B62D 25/08* (2006.01)
*B60G 7/02* (2006.01)

(56) References Cited

U.S. PATENT DOCUMENTS

| | | | |
|---|---|---|---|
| 7,213,873 B2 * | 5/2007 | Murata et al. | 296/204 |
| 7,703,805 B2 * | 4/2010 | Sasaki et al. | 280/784 |
| 7,771,137 B2 * | 8/2010 | Anzai et al. | 403/379.3 |
| 8,267,429 B2 * | 9/2012 | Takeshita et al. | 280/784 |
| 8,668,252 B2 * | 3/2014 | Yasuhara et al. | 296/193.07 |
| 2005/0200093 A1 * | 9/2005 | Komiya | 280/124.109 |
| 2005/0212334 A1 | 9/2005 | Murata et al. | |
| 2010/0004826 A1 | 1/2010 | Ostling et al. | |
| 2010/0289240 A1 | 11/2010 | Buschjohann et al. | |
| 2011/0101732 A1 * | 5/2011 | Baccouche et al. | 296/187.09 |
| 2012/0248820 A1 * | 10/2012 | Yasui et al. | 296/187.09 |
| 2012/0286543 A1 * | 11/2012 | Lee | 296/204 |

FOREIGN PATENT DOCUMENTS

| | | |
|---|---|---|
| JP | 08-175191 A | 7/1996 |
| JP | 08-282534 A | 10/1996 |
| JP | 2005-081954 A | 3/2005 |
| JP | 2005-206121 A | 8/2005 |
| JP | 2006-347253 A | 12/2006 |
| JP | 2009-061887 A | 3/2009 |
| JP | 2010-247598 A | 11/2010 |
| JP | 2011-162158 A | 8/2011 |
| JP | 2011-207241 A | 10/2011 |

OTHER PUBLICATIONS

Extended European Search Report dated May 22, 2015, issued in the corresponding EP Patent Application 12866771.4.

* cited by examiner

FRONT-END STRUCTURE FOR VEHICLE

TECHNICAL FIELD

The present invention relates to a front-end structure for a vehicle.

Priority is claimed on Japanese Patent Application No. 2012-013085, filed Jan. 25, 2012, and Japanese Patent Application No. 2012-025027, filed Feb. 8, 2012.

BACKGROUND ART

Among vehicles such as automobile vehicles, there is one in which a subframe supporting a suspension component in the vehicle front-end portion is provided, and this subframe is configured with a subframe main body and extension arms extending forward from the left and right of the front end of the subframe. The strength of a joint between the subframe main body and the extension arms is increased to thereby transmit frontal collision load to the rear floor (refer to Patent Document 1).

Moreover, there is one in which the subframe is formed with highly rigid aluminum alloy, and when a frontal collision load is applied to a suspension arm supported on this subframe, a weakened portion in front of the suspension arm rear end fastening portion at the rear end of the subframe is broken to absorb collision energy (refer to Patent Document 2).

Moreover, in the area of vehicles such as automobile vehicles, there is known a technique such that by bending a lower member positioned at the rear of the front cross member in the event of a frontal collision of the vehicle, a suspension component such as a stabilizer supported on the lower member is displaced downward to thereby ensure a crash stroke of the vehicle front-end portion (refer to Patent Document 3).

Furthermore, there is known a technique in which a subframe supporting suspension members on the lower portion of the vehicle front-end portion is provided, and a bolt that fixes the rear end portion of this subframe is pulled out by an explosion of an explosive triggered by a frontal collision, and the suspension members supported on the subframe are displaced downward, to thereby ensure a crash stroke for the vehicle front-end portion (refer to Patent Document 4).

DOCUMENT OF RELATED ART

Patent Documents

[Patent Document 1] Japanese Unexamined Patent Application, First Publication No. 2009-61887
[Patent Document 2] Japanese Unexamined Patent Application, First Publication No. 2006-347253
[Patent Document 3] Japanese Unexamined Patent Application, First Publication No. 2010-247598
[Patent Document 4] Specification, U.S. Patent Application, Publication No. 2010/0004826

SUMMARY OF INVENTION

Problems to be Solved by the Invention

In the technique of Patent Document 1, there is a problem in that the subframe does not perform energy absorption, and hence the amount of energy absorption is reduced. There is also a problem in that the rear end portion of the subframe presses and consequently deforms the dashboard panel.

In the technique of Patent Document 2, there is a problem in that the dashboard panel is pressed and deformed as a result of the electric power steering device and the like fixed to the subframe being pressed by the engine and transmission and moving backward.

Consequently, an aspect of the present invention has an object of providing a front-end structure for a vehicle capable of absorbing greater collision energy while achieving weight reduction and improving rigidity.

Moreover, in the technique of Patent Document 3, the joint strength between the front cross member and the floor panel is reduced since the lower member is designed to deform in the event of a collision. For this reason, it is necessary to reinforce the cross member and the front side frame in order to ensure suspension supporting rigidity. Consequently there is a problem in that weight increase becomes inevitable.

The structure in the technique of Patent Document 4 is such that the bolt is pulled out with use of an explosive. Therefore, there is a problem in that collision energy absorption at the bolt fastening portion cannot be expected, and it is difficult to set the amount of subframe deformation and the timing for detonating the explosive.

Consequently, an aspect of the present invention also has an object of providing a front-end structure for a vehicle that is capable of absorbing greater collision energy while suppressing weight increase, and that allows easy setting of energy absorption timing in the event of a collision.

Means for Solving the Problem

The present invention employs the following measures in order to achieve the above objects.

(1) An aspect of the present invention is such that: a subframe, which is provided across front side frames arranged along a vehicle lengthwise direction in left and right of a vehicle front-end portion and a vehicle body floor front portion to support a suspension component and an in-vehicle component, is supported at least at a front end portion and at a rear end portion; the subframe is provided with a subframe main body that is formed from a light alloy casting that supports the suspension component and the in-vehicle component at a rear portion, and a pair of left and right extension arms that are fixed to the subframe main body and extend forward of the subframe main body, and that are formed from a light alloy or steel by press molding; and at a rear portion of the extension arms and near the subframe main body, there is provided a weakened starting portion that serves as a point at which downward bending starts midway along the lengthwise direction of the subframe with an input load in an event of a vehicle frontal collision.

(2) In the aspect of (1) above, the subframe main body may, in the front end portion thereof, have an intermediate fastening portion that is fixed to the front side frames; the intermediate fastening portion and the front side frames may be fastened with a fastener; and in either one of an intermediate fastening portion insertion hole of the fastener that is provided in the front side frame, and an insertion hole of the fastener that is provided in the intermediate fastening portion, there may be provided a separation cutaway of the fastener that breaks and allows the intermediate fastening portion to move downward when the intermediate fastening portion receives a downward load.

(3) In either one of the aspect (1) and (2) above, in an upper surface of the subframe main body, between the intermediate fastening portion of the subframe main body and the rear end portion of the subframe main body, there may be formed an insertion recess portion into which a stabilizer serving as the suspension component is to be inserted in the vehicle widthwise direction; on an upper portion of the subframe main body, there may be fixed a power steering device; and a steering gear box of the power steering device may be provided at a position that blocks an opening portion of the insertion recess portion.

(4) In any one of the aspects (1) through (3) above, the subframe main body may be formed in a trapezoidal shape; the pair of the left and right extension arms may be arranged so as to increase the width therebetween with approach to the front side; and the rear end portion of the subframe main body may be connected to a floor center frame that is attached to the vehicle body floor.

(5) In any one of the aspects (1) through (4) above, the rear end portion of the extension arms may be fixed to the subframe main body by three fasteners that are inserted in the vertical direction and are arranged in a triangular shape.

(6) In any one of the aspects (1) through (5) above, the rear end portion of the extension arm may be fixed so as to sandwich a front-end supporting portion of a lower arm provided on the front end portion of the subframe main body; and the extension arm may extend forward along a bottom surface of the subframe main body.

(7) In any one of the aspects (1) through (6) above, the tip end of each extension arm may be connected respectively to a lower corner portion of a front bulkhead arranged in a vehicle front-end portion.

(8) In the aspect of (1) above, on the rear end portion, there may be provided a fastening portion for the front portion of the vehicle body floor, and a rear end extension portion may extend backward within a range between the fastening portion and the position near the heels of a passenger in a driving posture.

(9) In the aspect of (8) above, a floor tunnel portion may be formed in a vehicle widthwise center portion of the vehicle body floor, and there may be provided a floor center frame that extends along the lengthwise direction on each side of this floor tunnel portion; a front end extension portion may be provided on the front end portion of each floor center frame; the fastening portion of the subframe may be fixed to the front end extension portion of the floor center frame; and in front of the front end extension portion there may be arranged an in-vehicle component to be supported on the subframe.

(10) In the aspect of (9) above, the front end extension portion of the floor center frame may be provided with a recess portion that receives the rear end extension portion of the subframe.

(11) In either one of the aspects (9) and (10) above, the front end portion of the subframe may be positioned higher than the weakened starting portion of the subframe.

(12) In any one of the aspects (8) through (11) above, the rear end extension portion of the subframe may be have strength and rigidity greater than or equal to that of the portion of the subframe at the rear of the weakened starting portion.

(13) In any one of the aspects (8) through (12) above, a periphery of the fastening portion of the subframe may be reinforced.

(14) In any one of the aspects (8) through (13) above, the subframe may, in a portion at the rear of the weakened starting portion, have an intermediate fastening portion that fastens the front side frame; and in the intermediate fastening portion there may be provided a separation starting portion that is separated when a downward load is received.

Advantage of the Invention

According to the aspect of (1) above, when an input load is applied to the front end portion of the subframe in the event of a vehicle frontal collision, the subframe bends downward at the weakened starting portion of the extension arm, which is midway along the lengthwise direction, and therefore, the suspension component and the in-vehicle component supported on the subframe can be displaced downward. Accordingly, the suspension component and the in-vehicle component can be retracted to the outside of the crash stroke range of the front side frame, and a large vehicle body deformation stroke can be ensured, to thereby sufficiently absorb collision energy.

Moreover, since there is provided a subframe main body that is formed from a light alloy casting, weight reduction can be achieved while increasing supporting rigidity of the suspension component, and improving traveling stability.

Furthermore, since there are provided a pair of left and right extension arms that are formed from a light alloy or steel by means of press molding, bending deformation of the extension arms in the event of a vehicle frontal collision enables energy absorption at the time of the vehicle frontal collision.

According to the aspect of (2) above, if the extension arm of the subframe is to be bent downward at the weakened starting portion in the event of a vehicle frontal collision, the intermediate fastening portion of the subframe main body of the subframe receives a force on the lower side, and the separation cutaway of either the intermediate fastening portion insertion hole on the front side frame side of the fastener that fastens the intermediate fastening portion of the subframe main body and the front side frame, or the insertion hole of the intermediate fastening portion on the subframe main body side breaks, separating the fastener and the front side frame from each other, or the fastener and the intermediate fastening portion from each other. As a result, the intermediate fastening portion of the subframe main body is separated from the front side frame, and thereby bending deformation is allowed to occur at the weakened starting portion of the extension arm of the subframe.

According to the aspect of (3) above, the power steering device is attached to the upper portion of the subframe main body so that the opening portion of the insertion recess portion for the stabilizer, which is a suspension component provided in the subframe main body, is blocked by the steering gear box of the power steering device. As a result, it is possible to prevent deformation in the direction in which the insertion recess portion is closed by the steering gear box, in a crack starting at the insertion recess portion of the subframe main body, which is likely to crack since it is molded from a highly rigid but light metal casting.

According to the aspect of (4) above, it is possible to distribute an impact load at the time of a vehicle frontal collision to the vehicle body floor via the extension arm and the subframe main body and then through the floor center frame.

According to the aspect of (5) above, even if the impact load at the time of a vehicle frontal collision is applied to the joint portion of the extension arm rear end portion and the subframe main body, the extension arm, which is rotation-restricted by the three fasteners with respect to the subframe main body, will not rotate in the horizontal direction, and it is possible to promote downward bending deformation starting at the weakened starting portion of the extension arm.

According to the aspect of (6) above, it is possible to have an impact load being applied in the event of a vehicle frontal collision, applied to the lower arm rear end supporting portion which is a strong portion. Furthermore, since the center of mass of the subframe main body is positioned higher than the center of mass of the extension arm, it is possible, in the event of a vehicle frontal collision, to cause the moment of the subframe main body that rotates the portion of the extension arm, to act at the rear of the weakened starting portion, and it is possible to reliably bend the extension arm downward. Moreover, it is possible to ensure a sufficient engine arrangement space above the extension arm of the subframe.

According to the aspect of (7) above, it is possible, by means of the subframe, to increase the rigidity of the front bulkhead.

According to the aspect of (8) above, when an input load is applied to the front end portion of the subframe in the event of a vehicle frontal collision, the subframe bends downward at the weakened starting portion, and a load is applied in a manner such that the fastening portion of the rear end portion of the subframe is pulled out downward about the rear end of the subframe rear end extension portion. As a result, if the fastening portion of the subframe rear end portion is fixed with a bolt or the like, the load is applied in a manner such that the bolt destroys the front portion of the vehicle body floor and it is pulled out downward at the right timing. Therefore, it is possible to prevent upward deformation in the vehicle body floor while absorbing collision energy.

Moreover, since the subframe displaces downward the suspension component and the in-vehicle component that are supported on the subframe as a result of the subframe being bent downward at the weakened starting portion, the suspension component and the in-vehicle component can be retracted to the outside of the crash stroke range of the front side frame. That is to say, a large buckling stroke for the front side frame can be ensured to thereby sufficiently absorb collision energy.

Accordingly, even if the vehicle body floor in the vicinity of the feet of the passenger is pressed by the rear end extension portion of the subframe and is then deformed upward, the deformation is limited to merely a protrusion in the vicinity of the heel of the passenger. Therefore, unlike those cases where the area in the vicinity of the toes of the passenger is pressed, the vehicle body floor deforms in a direction of the angle of the passenger's ankle increasing, and the level of injury to the passenger can be minimized as a result.

According to the aspect of (9) above, it is possible to distribute the collision energy from the fastening portion of the subframe to the floor center frame, which has a high level of strength and rigidity. Moreover, since the rear end of the subframe rear end extension portion can be supported on the front end extension portion of the floor center frame, which has a high level of strength and rigidity, the length of the subframe on the rear side of the weakened starting portion can be made long, and the in-vehicle component supported on the subframe in the vicinity of the dashboard panel can be greatly retracted downward to ensure the crash stroke of the front side frame. As a result, it is possible to prevent the front side frame from being bent and the collision energy absorption amount from being reduced.

According to the aspect of (10) above, the portion of the front end extension portion of the floor center frame to be deformed can be adjusted by setting the length and the recess portion of the front end extension portion of the floor center frame that receives the rear end extension portion of the subframe, and the upper protrusion position of the vehicle body floor in the vicinity of passenger's feet can be set to a position where the level of influence on the passenger is low.

According to the aspect of (11) above, it is possible to make the weakened starting portion of the subframe likely to bend downward.

According to the aspect of (12) above, it is possible to rotate the subframe about the rear end extension portion rear end without deforming the rear end extension portion of the subframe. As a result, a fastener such as a bolt of the fastening portion of the subframe rear end portion can be reliably pulled out, using the principle of leverage.

According to the aspect of (13) above, the supporting rigidity of the subframe can be improved, and in those cases where the fastening portion of the subframe is fixed with a bolt or the like, separation of the bolt can be performed easily.

According to the aspect of (14) above, the suspension component can be supported at the rear of the weakened starting portion. Therefore, the vehicle front-end portion can be shortened and downsized. Moreover, the separation starting portion will not obstruct the operation of subframe rotation about the rear end of the rear end extension portion.

DESCRIPTION OF THE EMBODIMENTS

Figure 1:
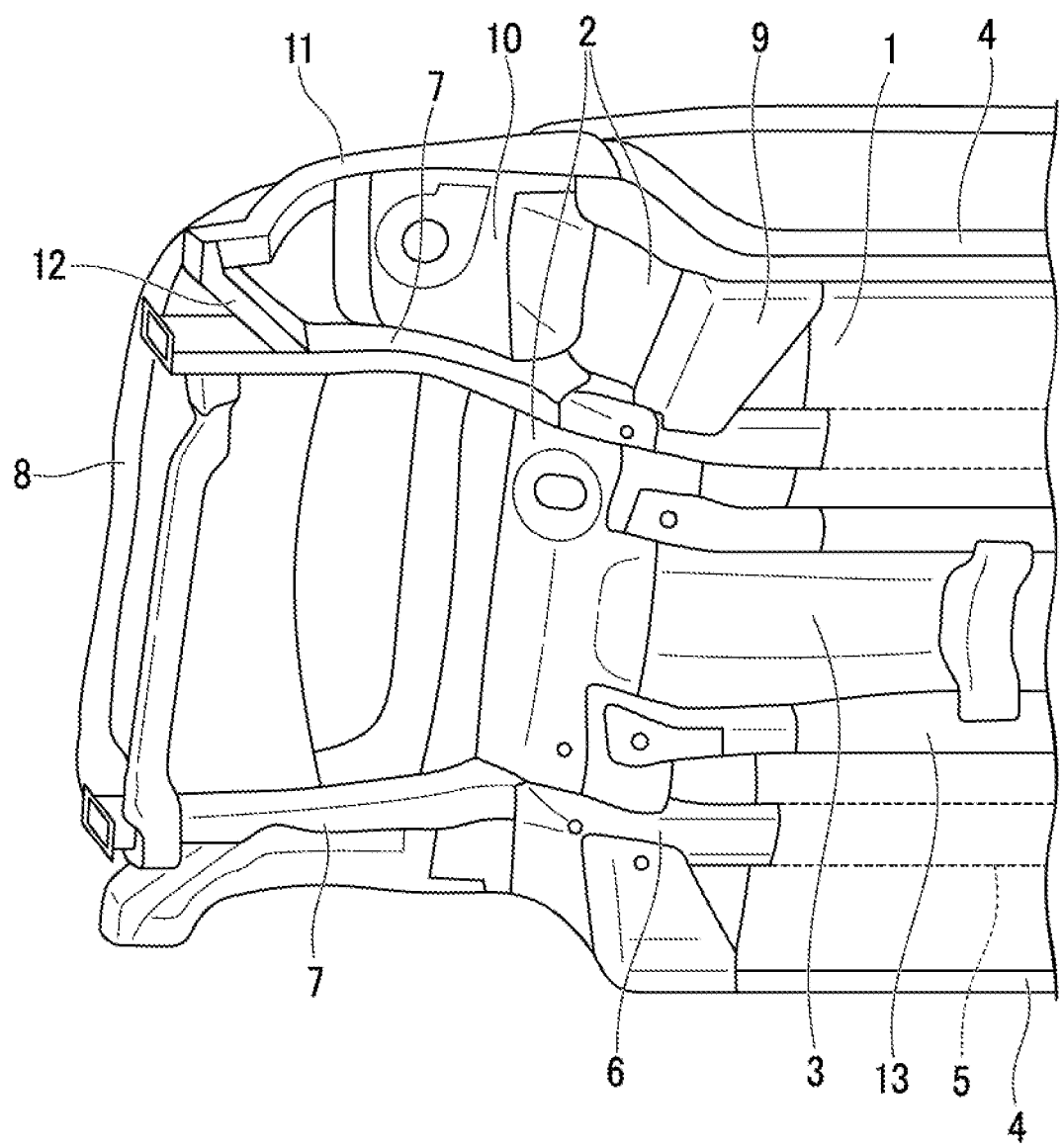
FIG. 1 is a perspective view of a vehicle front-end portion of a first embodiment according to the present invention, seen from the lower side.

Hereunder, a first embodiment of the present invention is described, based on the figures. FIG. 1 is a perspective view of a vehicle front-end portion, seen from the lower side. As shown for the vehicle front-end portion in FIG. 1, to a front end portion of a front floor panel 1, there is connected a rear end portion of a dashboard panel 2. The dashboard panel 2 may, alternatively, be referred to as a firewall. The dashboard panel 2 is configured in a manner such that the rear end portion thereof is formed flat as with the front floor panel 1, and the front side thereof rises with approach to the diagonally front side so as to separate the vehicle cabin from the engine room. The flat portion of the dashboard panel 2 and also the portion that starts to rise on the front side, are configured together as the front floor panel 1.

In the front floor panel 1, at the vehicle widthwise center portion, there is formed a floor tunnel portion 3 that expands along the lengthwise direction to the vehicle cabin inner side. This floor tunnel portion 3 extends toward the rear end portion of the dashboard panel 2, and is connected to a cutaway portion of the rear end portion of the dashboard panel 2. The floor tunnel portion 3 (and also similarly the dashboard panel 2) is such that it is not formed descending from the apex portion directly to the height of the front floor panel 1, but there is formed a slightly lower portion that is one step lower than the peak portion, and it then continues to the flat portion of the front floor panel 1 (refer to FIG. 16). Side seals 4 are attached to both sides of the front floor panel 1, and between each side seal 4 and the floor tunnel portion 3, along the vehicle lengthwise direction, there are provided sectionally hat-shaped floor frames 5 (shown with dashed lines) that are respectively joined to the upper surface of the flat portion of the front panel 1 and that form a sectionally closed structure portion.

A front side frame rear end 6 is joined to the lower surface of the dashboard panel 2 so as to overlap with the front end portion of the floor frame 5 from the lower side. At a position slightly higher than the flat portion of the front floor panel 1, as a framework structure of the engine room, front side frames 7 are joined to the front end portion of this front side frame rear end 6 along the vehicle lengthwise direction on the left and right sides of the vehicle front-end portion.

On the front end portion of the pair of left and right front side frames 7, a rectangular frame-shaped front bulkhead 8 is attached to side stays 8s (refer to FIG. 4) that extend vertically. Between the front side frame rear end 6 and the front end portion of the side seal 4, there is connected an outrigger 9, and a wheelhouse 10 is connected to the front end portion of the dashboard panel 2 positioned on the front side of the outrigger 9.

On the upper side of the wheelhouse 10 there is joined a wheelhouse upper member 11; on the front end portion of the wheelhouse upper member 11 there is joined the front end portion of a wheelhouse lower extension 12; and the rear end portion of the wheelhouse lower extension 12 is joined to the side portion of the front side frame 7.

On the lower surface of the front floor panel 1 there are attached sectionally hat-shaped floor center frames 13 that extend along the vehicle lengthwise direction on both sides of the floor tunnel portion 3 and that form a sectionally closed structure portion on the lower surface of the front floor panel 1.

Figure 2:
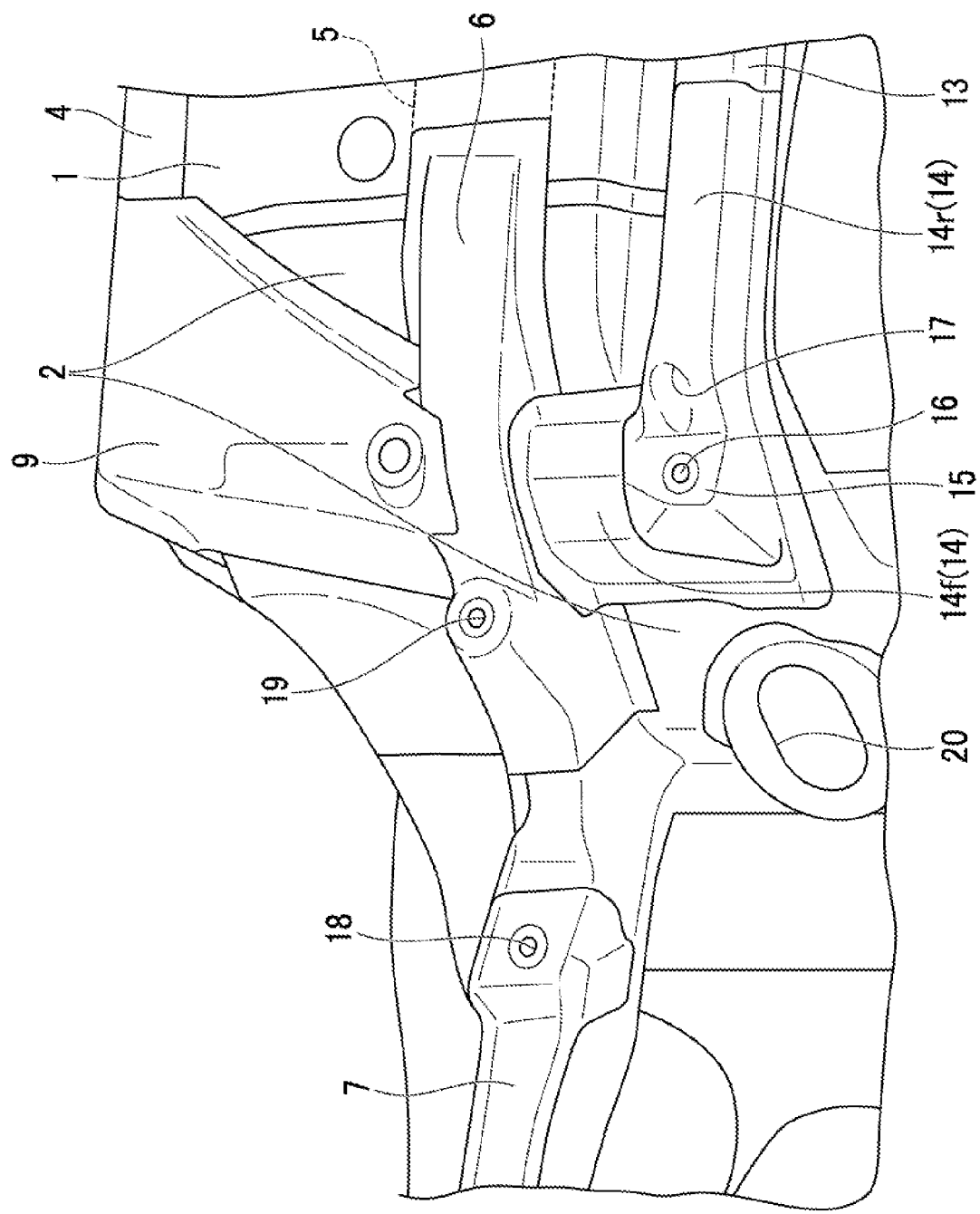
FIG. 2 is an enlarged perspective view of a relevant portion of FIG. 1.

FIG. 2 is an enlarged perspective view of the relevant portion of FIG. 1, showing an enlarged view of the left front side of the front floor panel 1 seen from the lower side. In FIG. 2, the front side frame rear end 6 is a sectionally hat-shaped member; it forms a sectionally closed structure on the lower side of the joint portion between the front floor panel 1 and the dashboard panel 2; the rear end portion is joined to the front end portion of the floor frame 5 (shown with dashed line) at a position that overlaps from the lower side; and the front end portion is connected to the rear end portion of the front side frame 7.

Therefore, by means of this front side frame rear end 6, the front side frame 7 of a sectionally closed structure and the floor frame 5 (shown with dashed line) that forms a sectionally closed structure portion on the front floor panel 1, are connected by the sectionally closed structure portion.

The front end portion of the floor frame 5 and the rear end portion of the front side frame rear end 6 have portions that overlap with each other while having the front floor panel 1 therebetween, and in the portion where they overlap with another portion, they are formed so that the sectional area thereof becomes smaller with approach to the tip end portion, to be joined to the front side and back side of the front floor panel 1.

The outrigger 9 overlaps on the vehicle widthwise outer side of the front side frame rear end 6 from the lower side (upper side in FIG. 2), across the bottom wall portion of each front side frame rear end 6 and each side seal 4. The outrigger 9 is joined to the lower surface of each side seal 4 so as to straddle the border portion between the front floor panel 1 and the dashboard panel 2, in the vehicle widthwise outer side portion.

An L-shaped front end extension portion 14 is joined to the front end portion of each floor center frame 13 from the lower side (upper side in FIG. 2), across the front floor panel 1 and the dashboard panel 2. This front end extension portion 14 comprises a rear portion 14r that is formed in a sectionally hat-shape to overlap on the floor center frame 13 and form a sectionally closed structure portion, and a front joint portion 14f that continues to this rear portion 14r while bending outward and that similarly forms a sectionally closed structure portion. The front joint portion 14f extends outward in the vehicle widthwise direction from the front end of the rear portion 14r, and the widthwise outer side portion of the periphery flange portion is joined to the inner wall of the front side frame rear end 6. By means of this front end extension portion 14 having the front joint portion 14f, the floor center frame 13 and the front side frame 7 are connected by the sectionally closed structure portion.

The front joint portion 14f is provided with a subframe rear end attachment seat 15 facing downward toward the front end side. In the subframe rear end attachment seat 15, there is formed a bolt hole 16. This subframe rear end attachment seat 15 is provided at a position lower than the height of the floor center frame 13 in FIG. 2. In the rear of the subframe rear end attachment seat 15, there is formed a recess portion 17 that prevents interference of a rear terminal of the subframe main body 23 and the subframe 22.

Here, a subframe intermediate joint hole 18 is formed in the rear end portion of the front side frame 7, and a rear end supporting bracket outer attachment hole 19 of the lower arm is formed at the front end portion of the front side frame rear end 6. In the dashboard panel 2, on the front side of the front end extension portion 14, there is formed a steering shaft insertion hole 20.

Figure 3:
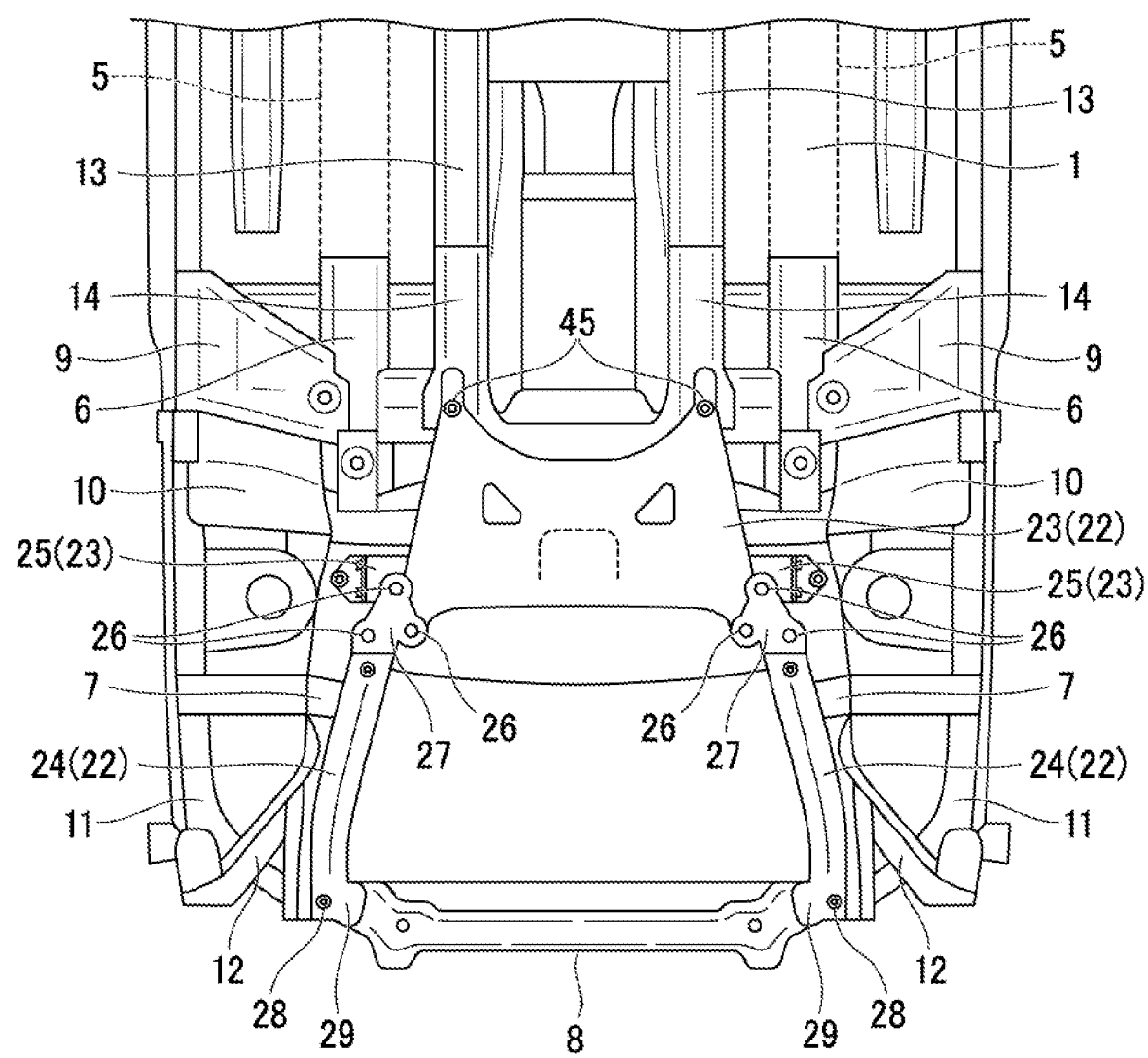
FIG. 3 is a bottom view of the vehicle front-end portion seen from the lower side.
Figure 4:
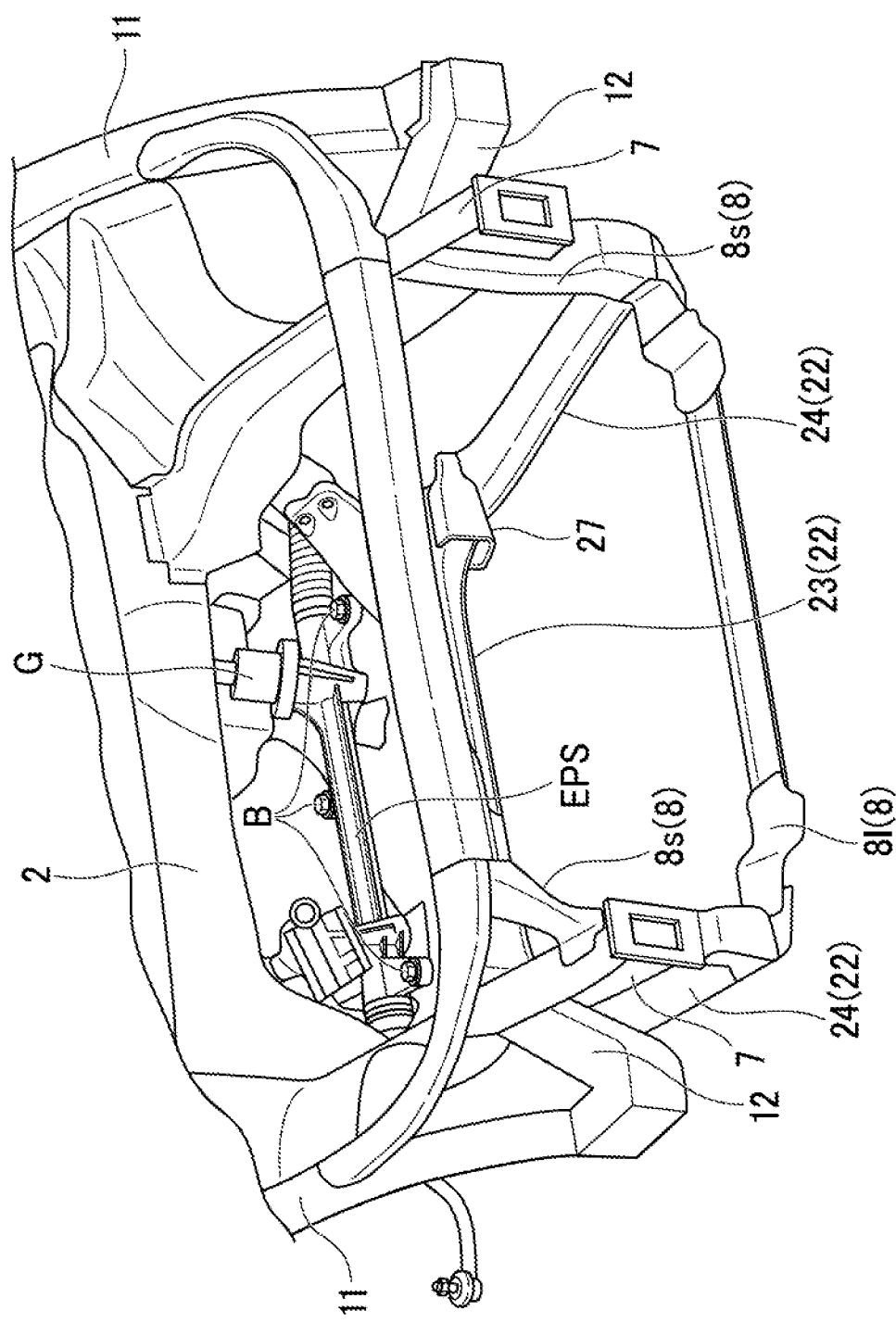
FIG. 4 is a perspective view of the vehicle front-end portion seen from the diagonally upper right side.
Figure 5:
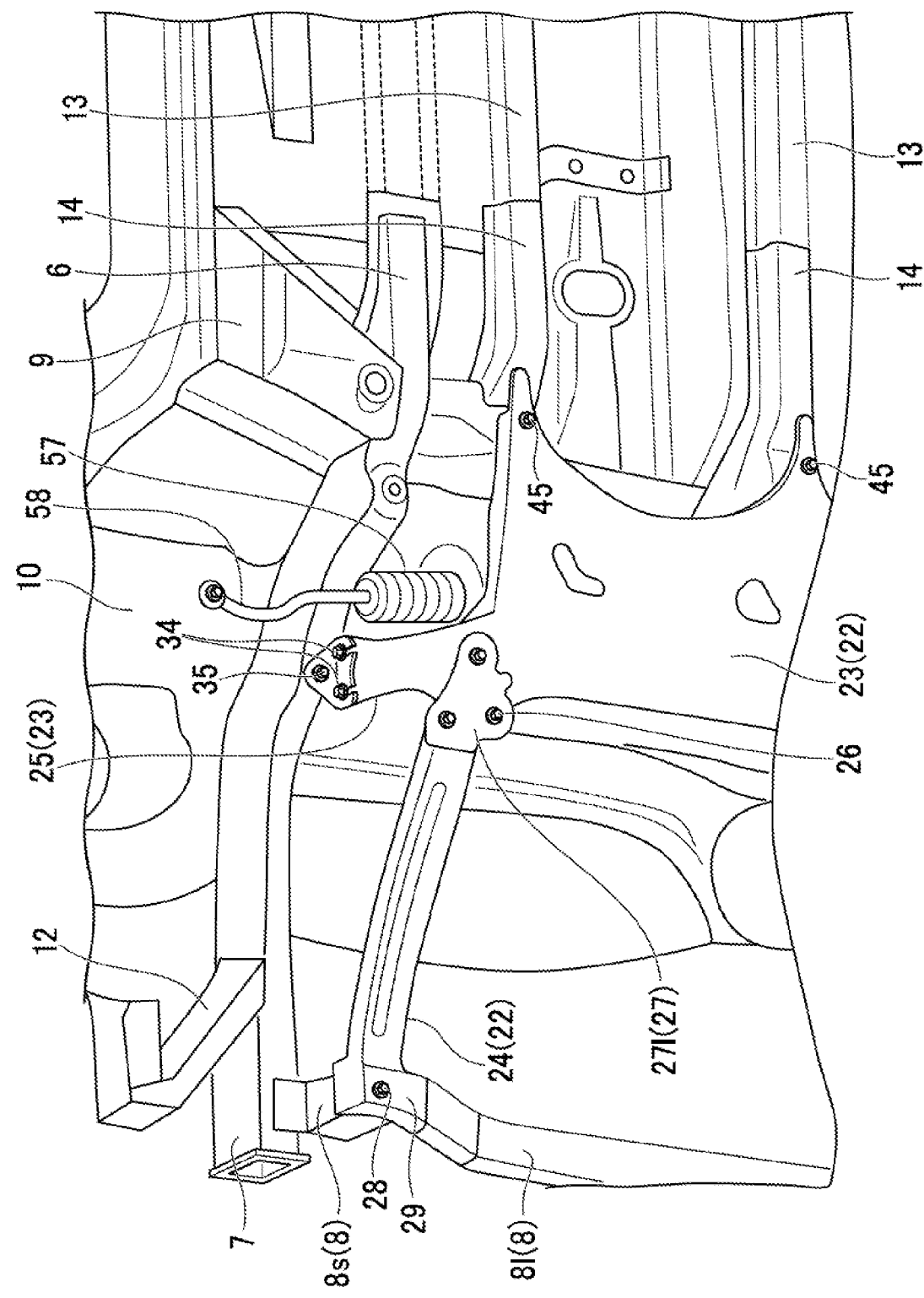
FIG. 5 is a perspective view of the left side of the vehicle front-end portion seen from the lower side.

FIG. 3 through FIG. 5 each shows a state with the subframe attached. FIG. 3 is a bottom view of the vehicle front-end portion seen from the lower side, FIG. 4 is a perspective view of the vehicle front-end portion seen from the diagonally right upper side, and FIG. 5 is a perspective view of the vehicle front-end portion left side seen from the lower side.

As shown in FIG. 3 through FIG. 5, across the front side frames 7 and the front portion of the front floor panel 1, the subframe 22 that supports; a lower arm, suspension components including the tire, and an electric power steering device EPS (described later), is supported at the front end portion, the rear end portion, and the lengthwise center portion. Specifically, the subframe 22 is fixed across both lower end corner portions of the front bulkhead 8 attached to the front side frames 7 and the front end extension portion 14 of the front end of the floor center frame 13 attached to the front floor panel 1.

The subframe 22 includes a subframe main body 23 cast from an aluminum alloy, and a pair of left and right extension arms 24 that broaden and extend forward from the front end both side portions of the subframe main body 23 and that are formed from a light alloy or steel by means of press molding. The electric power steering device EPS is fixed with bolts B at positions in front of the front end extension portion 14, which are three locations in the vehicle widthwise direction on the subframe 22, that is, the upper surface of the subframe main body 23, as shown in FIG. 4. These three locations are two front side locations on the vehicle widthwise both sides, and one rear side location at the vehicle widthwise center portion. In FIG. 4, a steering gear box G is provided on the left side of the electric power steering device EPS, and the steering gear box G is arranged in the vicinity of and on the lower side of the steering shaft insertion hole 20.

Figure 6A:
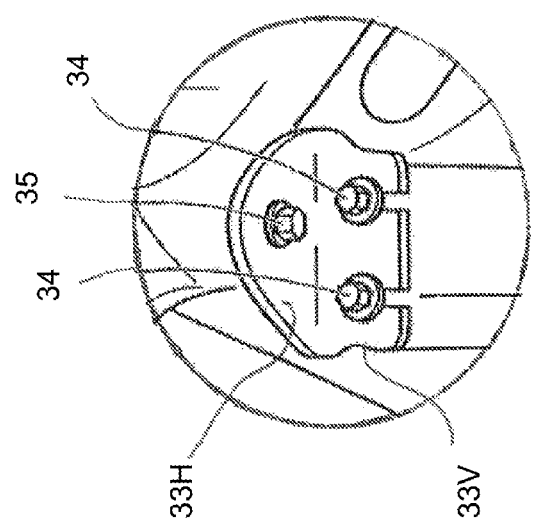
FIG. 6A is an enlarged detail view of a portion of FIG. 6.
Figure 6:
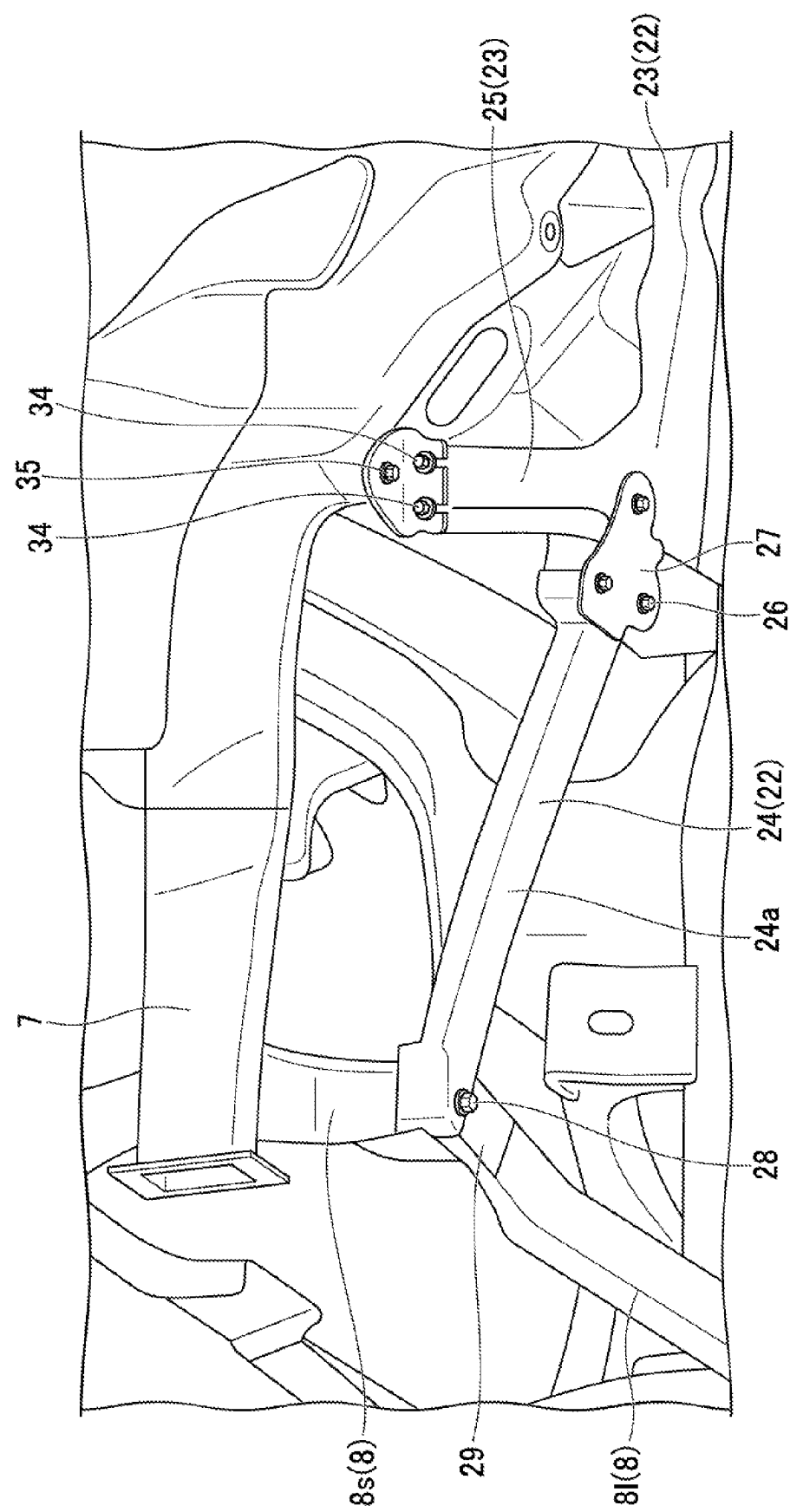
FIG. 6 is a perspective view of the vehicle front-end portion seen from the diagonally lower left outer side.

The subframe main body 23 is a substantially trapezoidal member having, when seen on the plan view, a rear edge that bends forward, left and right side edges that open outward toward the front side and that extend linearly, and a front edge that linearly extends in the vehicle widthwise direction. The subframe main body 23 is configured in a manner such that the upper surface thereof is flat; a plurality of intersecting vertical ribs (refer to FIG. 11 and FIG. 12) for increasing rigidity are provided on the lower surface; and on each of two side portions of the subframe main body 23, there is provided an upper attachment arm portion 25 that extends upward from a base portion of the subframe main body, and these upper attachment arm portions include outer ends which are operatively attached to the respective side frames. As best seen in FIGS. 3 and 5-6, the upper arm attachment portions 25 of the subframe main body also extend divergently outwardly in opposite directions as they extend upward.

Figure 7:
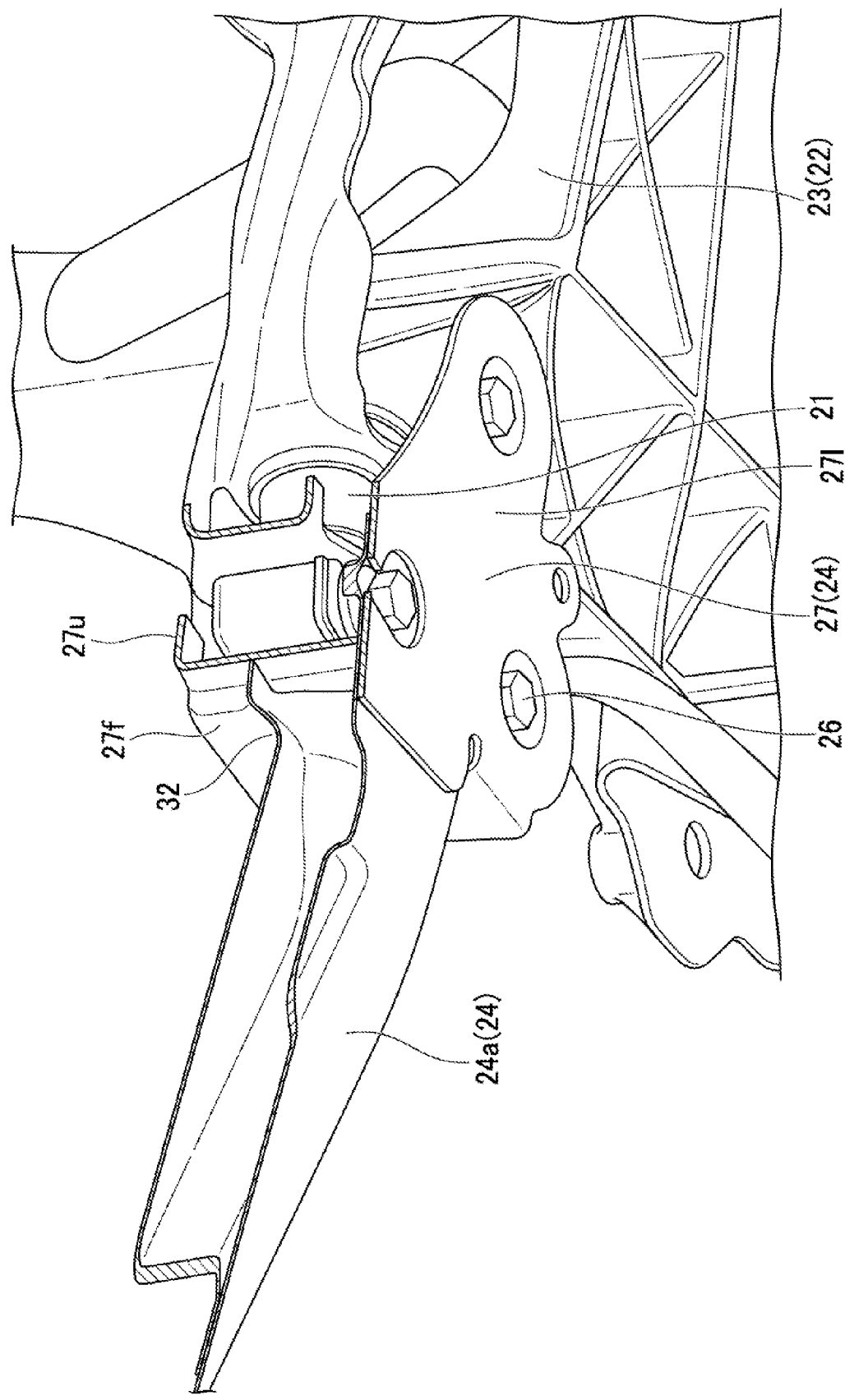
FIG. 7 is a partially cutaway sectional view showing a front end supporting portion of a lower arm.
Figure 8:
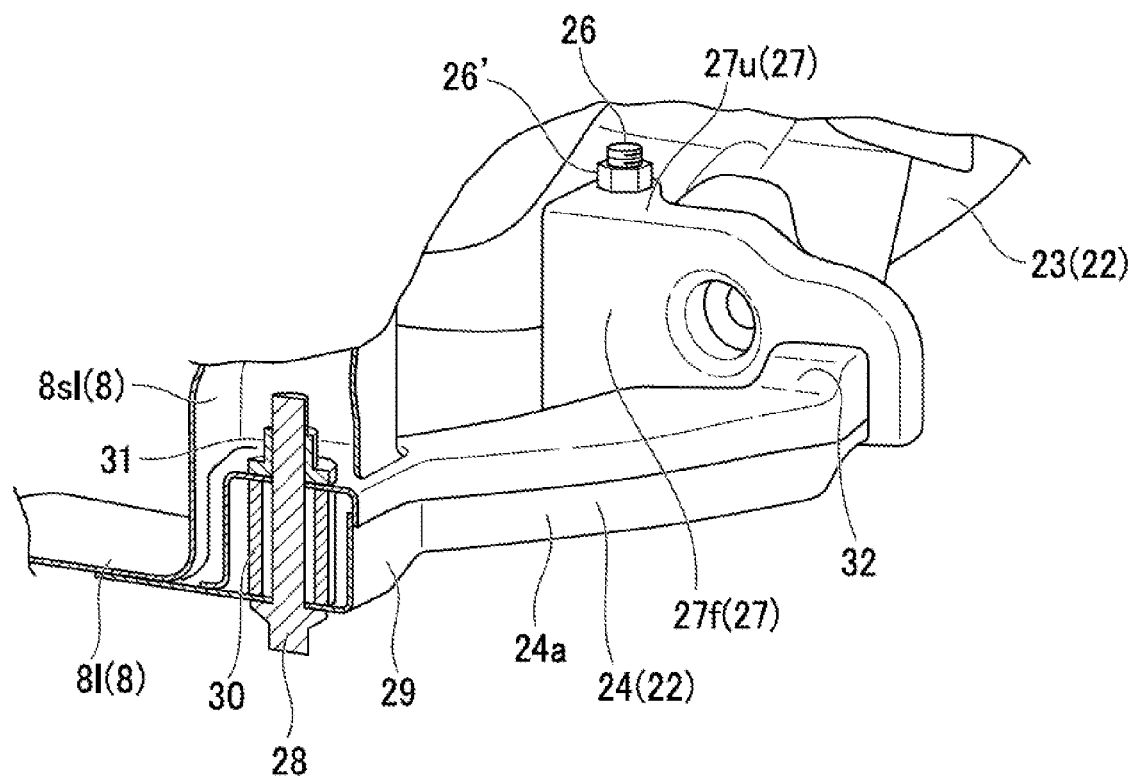
FIG. 8 is a partially cutaway perspective view of an attachment portion of an extension arm, seen from the left front diagonally front side.
Figure 9:
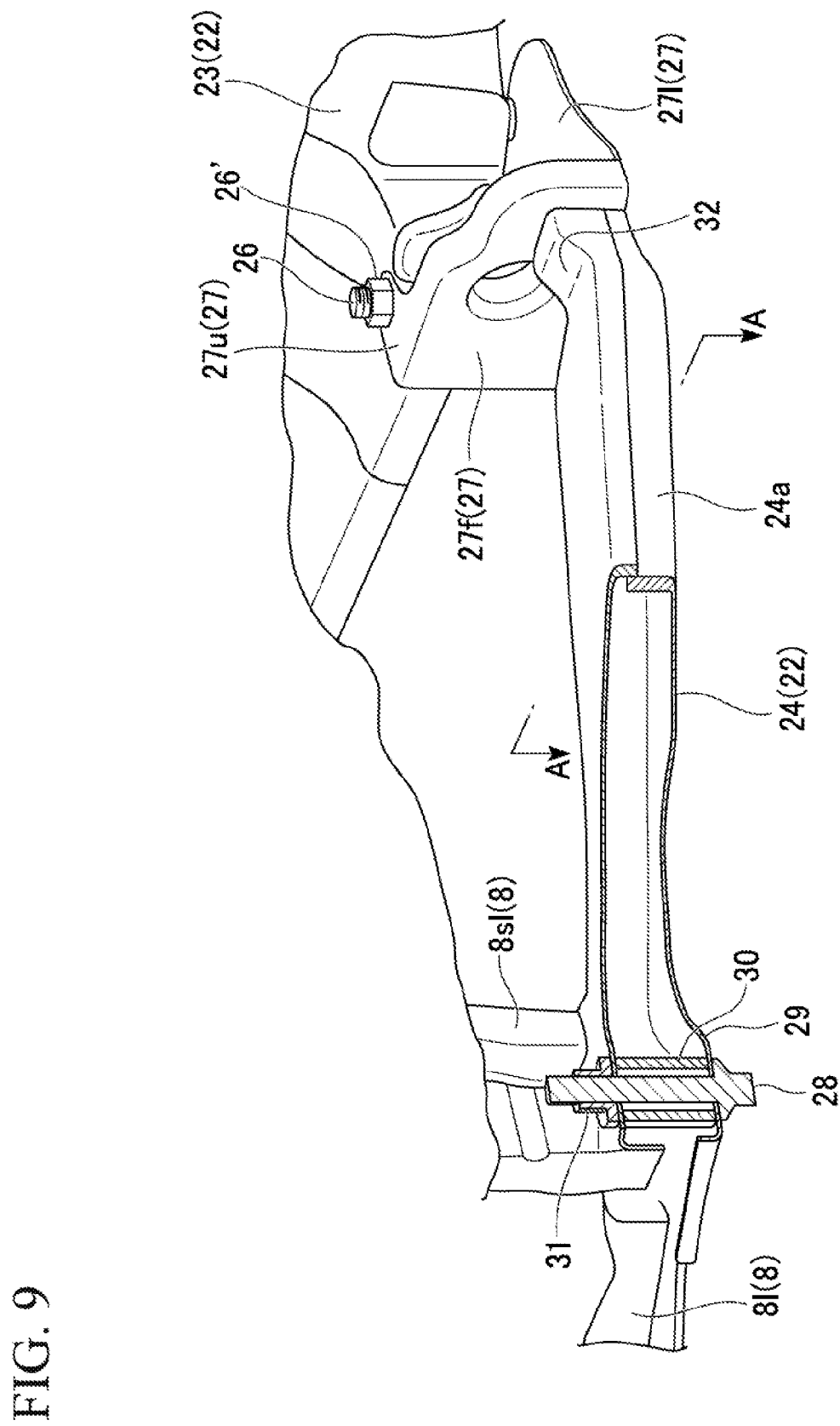
FIG. 9 is a partially cutaway perspective view of the attachment portion of the extension arm, seen from the left slightly diagonally front side.

FIG. 6 is a perspective view of the vehicle front-end portion seen from the diagonally lower left outer side, FIG. 7 is a partially cutaway sectional view showing the front end supporting portion of the lower arm, FIG. 8 is a partially cutaway perspective view of the attachment portion of the extension arm seen from the left front diagonally front side, and FIG. 9 is a partially cutaway perspective view of the attachment portion of the extension arm seen from the left slightly diagonally front side. As shown in FIG. 6 through FIG. 9, the extension arms 24 include an extension arm main body 24a, a rear end attachment portion 27 provided on the rear end portion of the extension arm main body 24a, and a front end attachment portion 29 provided on the front end portion of the extension arm main body 24a.

The rear end attachment portion 27 comprises an attachment plate 271 that supports the front corner portion of the subframe main body 23 from the lower side, an upper attachment piece 27u on the upper side, and a front wall 27f that connects these members.

The attachment plate 271 is fastened and fixed with three fastening bolts 26 that are inserted into screw holes (boss shape thereof being integrally formed) of the subframe main body 23 so as to form a triangular shape from the lower side to the upper side, and the upper attachment piece 27u is fastened and fixed with a nut 26' on a single fastening bolt 26 inserted therethrough from the lower side. By means of this rear end attachment portion 27, the extension arms 24 sandwich from the upper and lower sides the front end supporting portion 21 of the lower arm 38 (refer to FIG. 11), which is provided on the front end portion of the subframe main body 23 and which is described later, while pressing the front thereof, and they are fixed in a state of extending forward along the bottom surface of the subframe main body 23.

Here, the attachment plate 271 has an area larger than that of the upper attachment piece 27u and extends backward, and the upper attachment piece 27u is formed on the upper inner side of the rear end attachment portion 27. The upper portion of the rear end attachment portion 27 extends outward from the upper attachment piece 27u, and the height thereof then gradually reduces (refer to FIG. 8), eventually descending downward. To the area near the outer side on the front wall 27f of the rear end attachment portion 27, there is connected the rear end portion of the extension arm 24a by means of MIG welding.

The front end attachment portion 29 of the extension arms 24 is arranged at a position higher than the rear end attachment portion 27 (ground height) (refer to FIG. 19), and it is fastened and fixed with a fixation bolt 28 to the front end portion of the extension arm main body 24a at the lower corner portion of the front bulkhead 8, that is, to the joint portion of a side stay 8s and a lower cross 81. Specifically, as shown in FIG. 8, the front end attachment portion 29 is fastened and fixed from the lower side with the fixation bolt 28 and a nut 31 via a collar 30. The tip end lower piece of the front end attachment portion 29 is fastened to the lower surface of the lower cross 81 of the front bulkhead 8.

Figure 10:
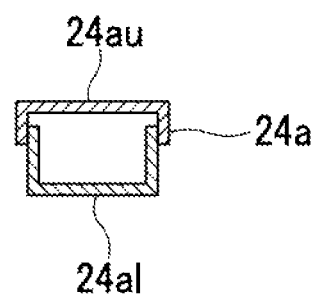
FIG. 10 is a sectional view taken along line A-A of FIG. 9.

The extension arm main body 24a is formed in a sectionally closed structure in which a sectionally open-shaped lower member 24a1 that is open on the upper side thereof is inserted from the lower side into a sectionally open-shaped upper member 24au that is open on the lower side thereof (refer to FIG. 10). In the rear end portion of the extension arm main body 24a, on the slightly front side of the rear end attachment portion 27 that is attached to the front wall 27f, there is formed a recessed portion 32, at which the height of the extension arm 24 is minimized. This recessed portion 32 is a portion that appears constricted on the side view, and it usually does not bend in any way under normal driving conditions. However, it is a starting point of downward bending midway along the lengthwise direction of the subframe 22 with a predetermined input load in the event of a vehicle frontal collision. This recessed portion 32 forms a weakened starting portion at which the extension arm main body 24a, that is, the extension arm 24, starts to bend. Here, the recessed portion 32 is formed at a position lower than the front end attachment portion 29 of the extension arm 24. Moreover, the subframe 22 is provided with the upper attachment arm portion 25 in the rear portion of the recessed portion 32. In one embodiment, both the upper member 24au and the lower member 24a1 may be tapered inwardly to form the recessed portion 32. Alternatively, if desired, in a modified embodiment, the recessed portion 32 may be provided just in the upper member 24au.

Figure 11A:
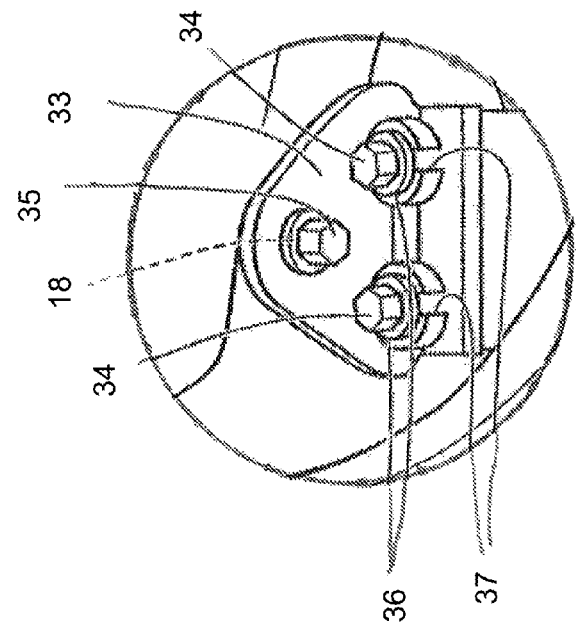
FIG. 11A is an enlarged detail view of a portion of FIG. 11.
Figure 3A:
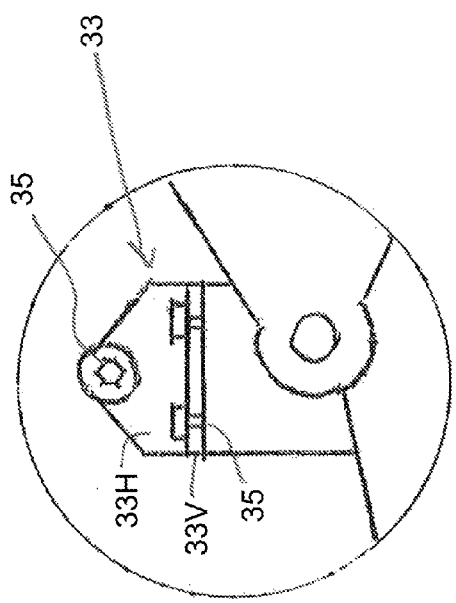
FIG. 3A is an enlarged detail view of a portion of FIG. 3.
Figure 11:
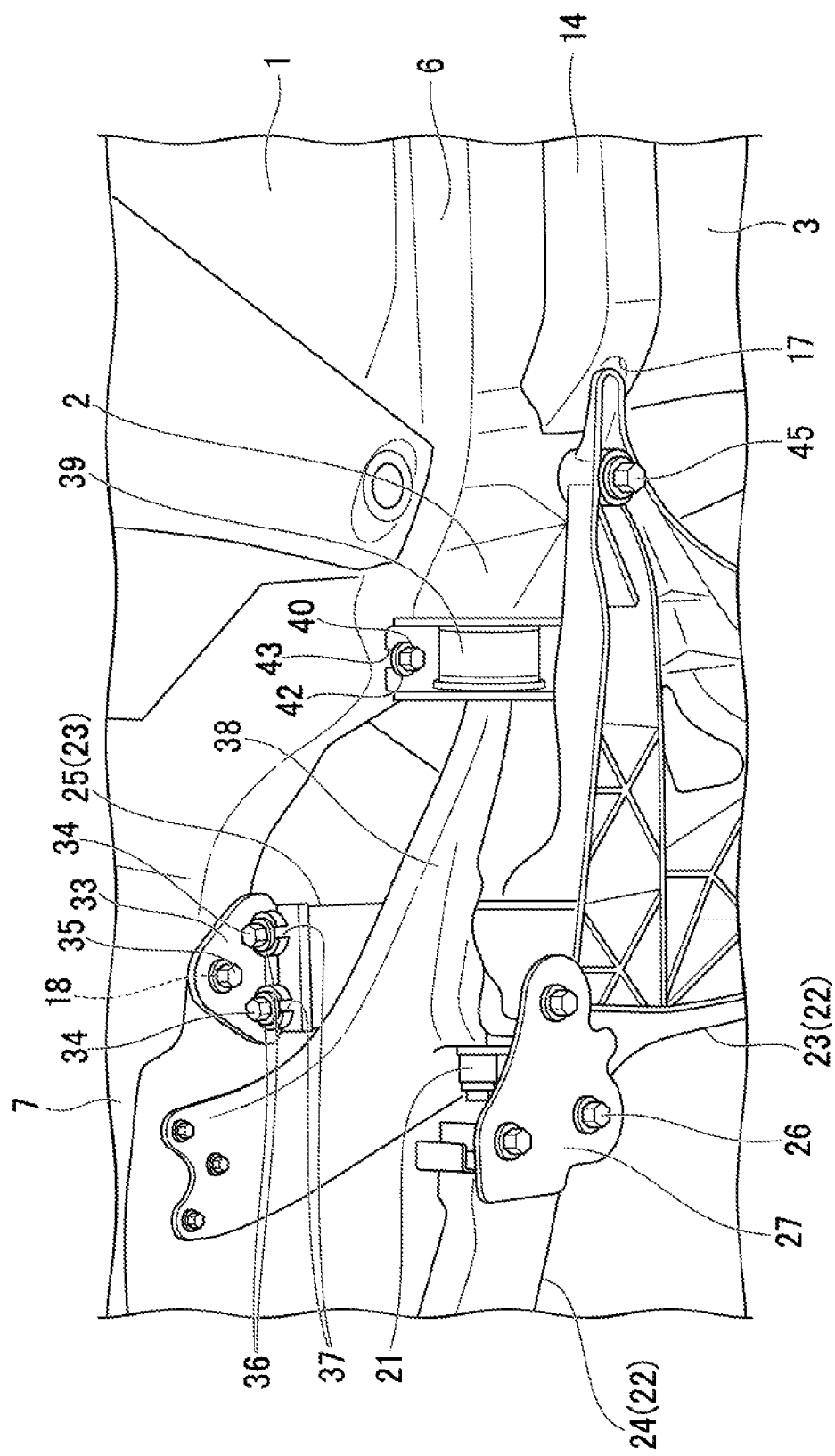
FIG. 11 is a perspective view showing a state with the lower arm attached, seen from the diagonally left lower side.
Figure 20:
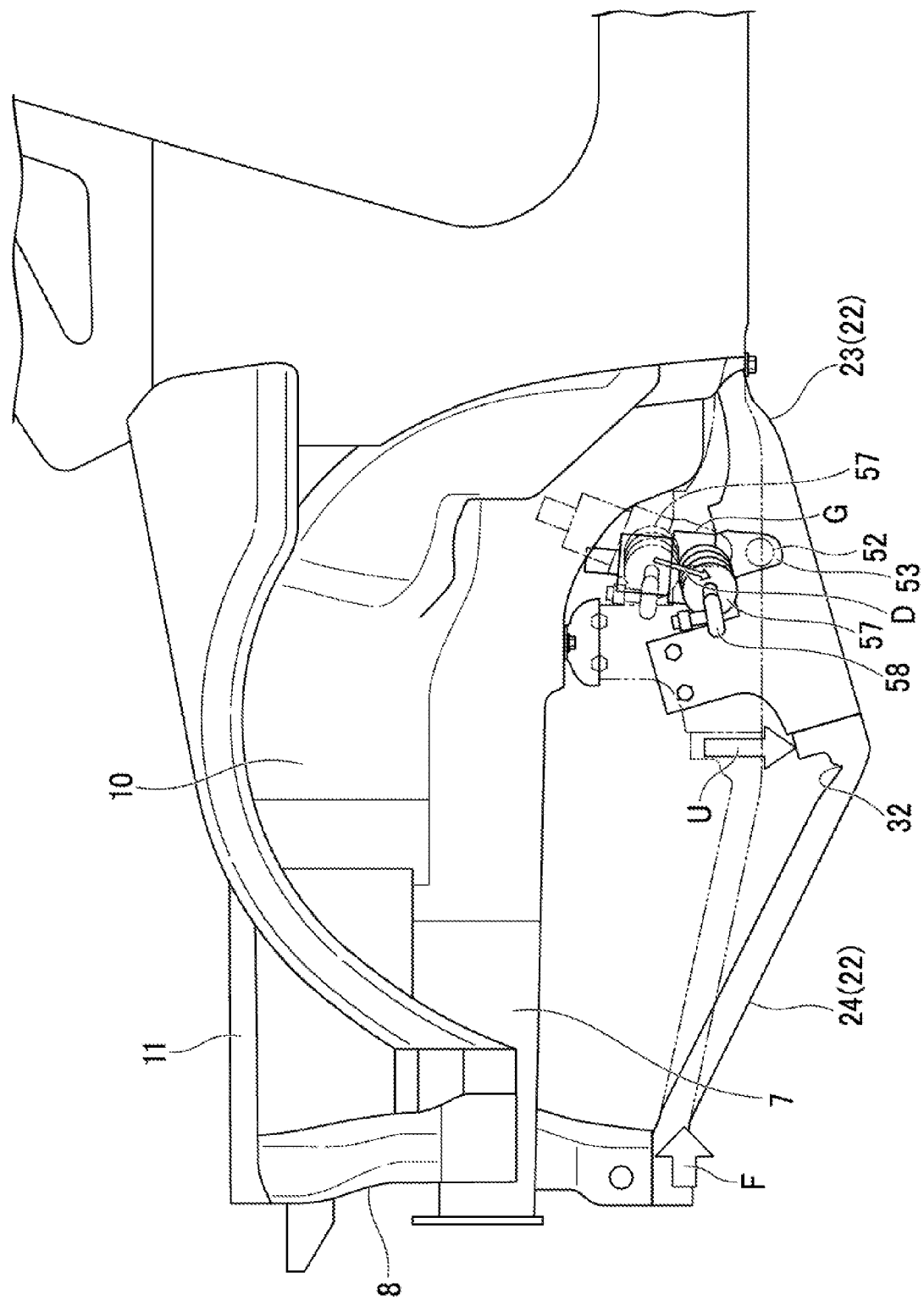
FIG. 20 is a side explanatory view showing a collisional state.

As shown in FIG. 11, a connecting bracket 33 (which functions as part of the front side frame 7) is fixed to the upper end portion of the upper attachment arm portion 25 of the subframe main body 23. As seen in FIGS. 3A, 6A and 11A, the connecting bracket 33 includes a substantially horizontally extending portion 33H and a substantially vertically extending portion 33V. In the depicted embodiment, the substantially vertically extending portion 33V has a separation starting portion 37 formed therein, that is configured to permit separation of the subframe main body 23 from the side frames 7 when a downward load is received during a vehicle frontal collision. Two substantially horizontally oriented fixation bolts 34 extend through the substantially vertically extending portion 33V from a side thereof to the outer side. This connecting bracket 33 is fastened and fixed to the front side frame 7 with a fastening bolt 35 that is inserted upward into the subframe intermediate joint hole 18 (refer to FIG. 2) of the rear end portion of the front side frame 7. Here, in areas of the substantially vertically extending portion 33V immediately surrounding each of the bolt insertion holes 36 into which the fixation bolts 34 are inserted, there is respectively provided the separation cutaway 37, which is a partial cutaway of the lower side thereof. The above-described configuration permits the subframe main body 23, including the upper attachment arm portions 25 and the horizontally oriented fixation bolts 34, to move downwardly under the effect of a downward force in a front-end collision, as illustrated in FIG. 20.

As a result, in the case where the extension arms 24 bend downward from the recessed portion 32 serving as a bending starting point, if a downward load is applied to the fixation bolts 34, the fixation bolts 34 are pulled out downward from the separation cutaway 37 and are separated from the connecting bracket 33 while leaving the connecting bracket 33 with the front side frame 7, to allow the upper attachment arm portion 25, that is, the subframe main body 23, to displace downward. Therefore, the size of the separation cutaway 37 is determined to correspond to the load that is expected to be applied when the subframe main body 23 is bent.

Figure 12:
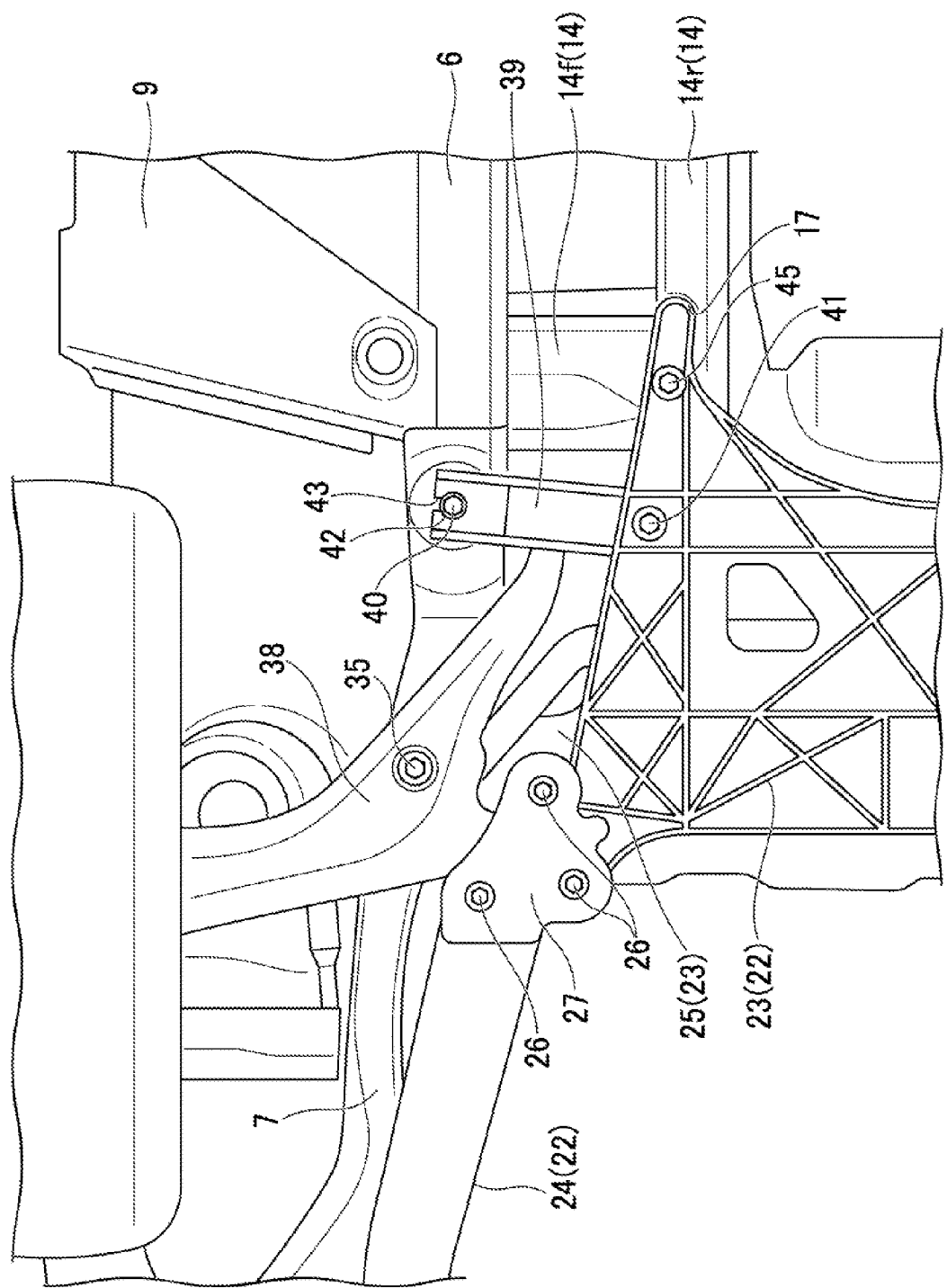
FIG. 12 is a bottom view of a relevant portion showing a state with the lower arm attached.
Figure 13:
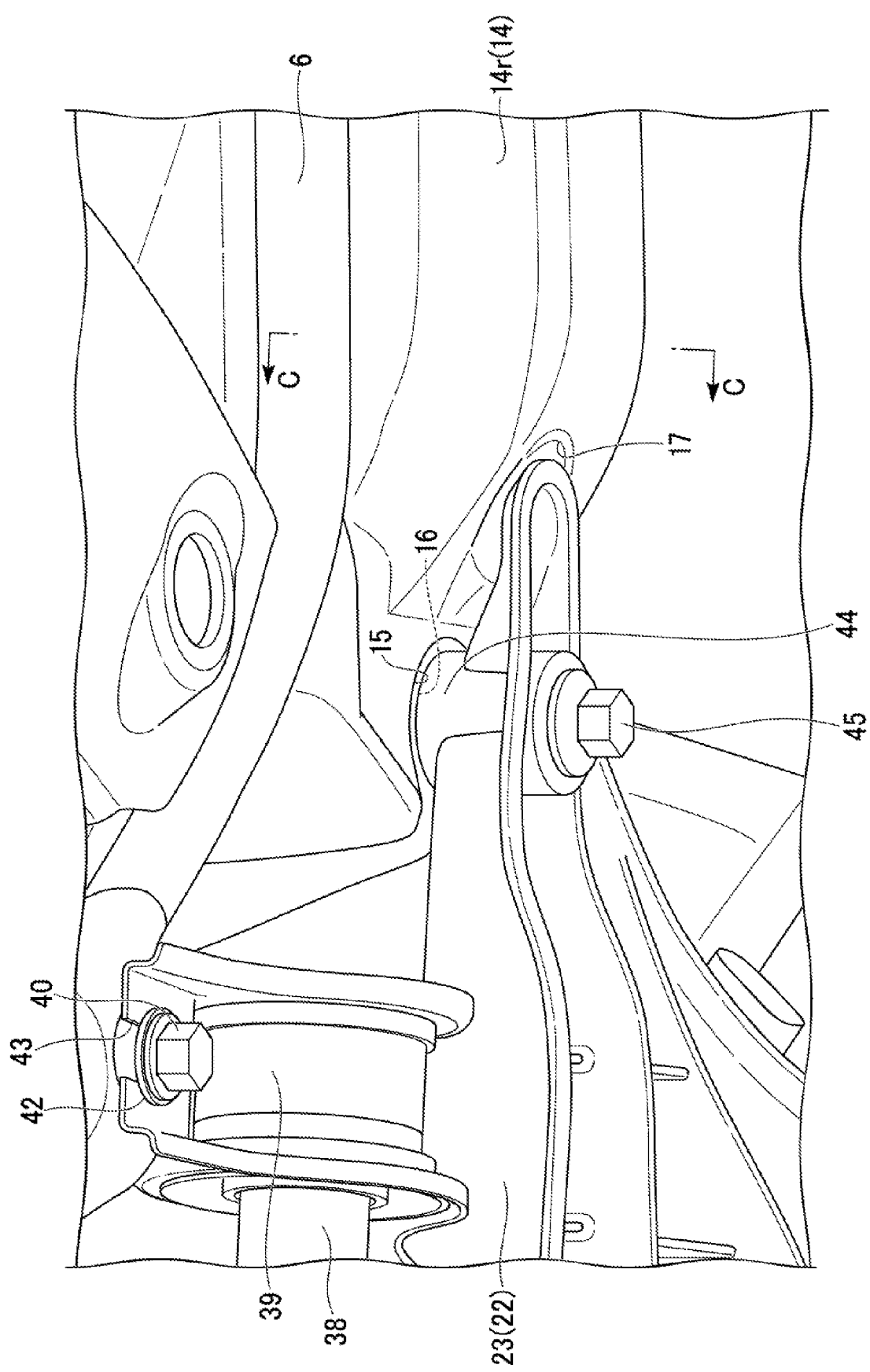
FIG. 13 is a perspective view of the vicinity of a rear end extension portion, seen from the lower side.

In FIG. 11, FIG. 12, and FIG. 13, reference symbol 38 denotes a lower arm, which is a suspension component. The lower arm 38 has its rear end portion supported on the front side frame 7 and the subframe main body 23 via a supporting bracket 39 while being able to swing substantially about the lengthwise axis, and its front end portion is supported via a supporting portion 21 provided on the front end portion of the subframe main body 23 while being able to swing substantially about the lengthwise axis.

Specifically, the supporting bracket 39 is configured so as to surround a bearing member (not shown in the figure) in a U shape, and a supporting bolt 40 inserted into an insertion hole 42 of the outer side end portion from the lower side, is fastened and fixed in a rear end supporting bracket outer attachment hole 19 (refer to FIG. 2), while the inner side end is fastened and fixed to an attachment portion of the subframe main body 23 with a fixation bolt 41.

Here, in the outer insertion hole 42 of the supporting bracket 39, there is provided a separation cutaway 43 that functions as a separation starting portion, the outer side of which is partially cut away.

As a result, in the case where the extension arms 24 bend downward from the recessed portion 32 serving as a bending starting point, the supporting bracket 39 is separated while leaving the supporting bolt 40, to allow the lower arm 38 to displace downward. Therefore, the size of the separation cutaway 43 is determined to correspond to the load that is applied when the subframe 22 is bent.

As shown in FIG. 13, on both sides of the rear portion of the subframe main body 23, there is provided a fastening portion 44 for the subframe rear end attachment seat 15 of the front end extension portion 14 of the floor center frame 13, which is connected to the front portion of the front floor panel 1, that is, the front floor panel 1. This fastening portion 44 is a cylindrical portion, and a fastening bolt 45 is inserted from the lower side into this fastening portion 44 to be fastened and fixed in a bolt hole 16 (refer to FIG. 2 and FIG. 15) provided in the subframe rear end attachment seat 15.

Figure 14:
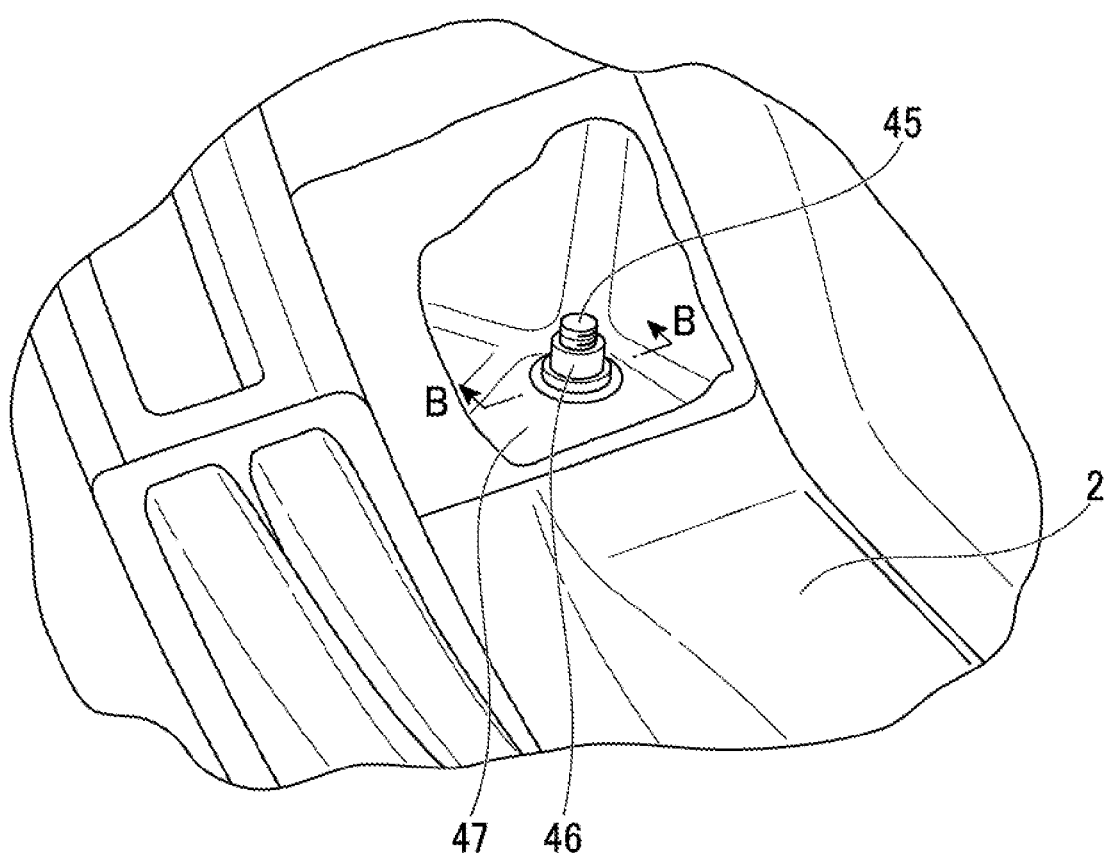
FIG. 14 is a perspective view of a fastening portion seen from the vehicle cabin interior.
Figure 15:
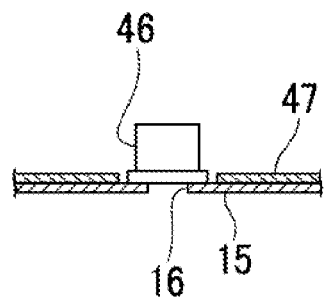
FIG. 15 is a sectional view taken along line B-B of FIG. 14.

FIG. 14 is a partially cutaway perspective view of the fastening portion 44 seen from the vehicle cabin interior. FIG. 15 is a sectional view taken along line B-B of FIG. 14 (excluding the fastening bolt 45). As shown in FIG. 14 and FIG. 15, the fastening bolt 45 inserted into the fastening portion 44 is fastened to a weld nut 46 which is welded to the back side of the subframe rear end attachment seat 15. In the periphery of this weld nut 46 there is welded and fixed in an overlapping manner, a reinforcing plate 47 that surrounds the weld nut 46 with a diameter greater than the outer dimension of this weld nut 46.

Figure 16:
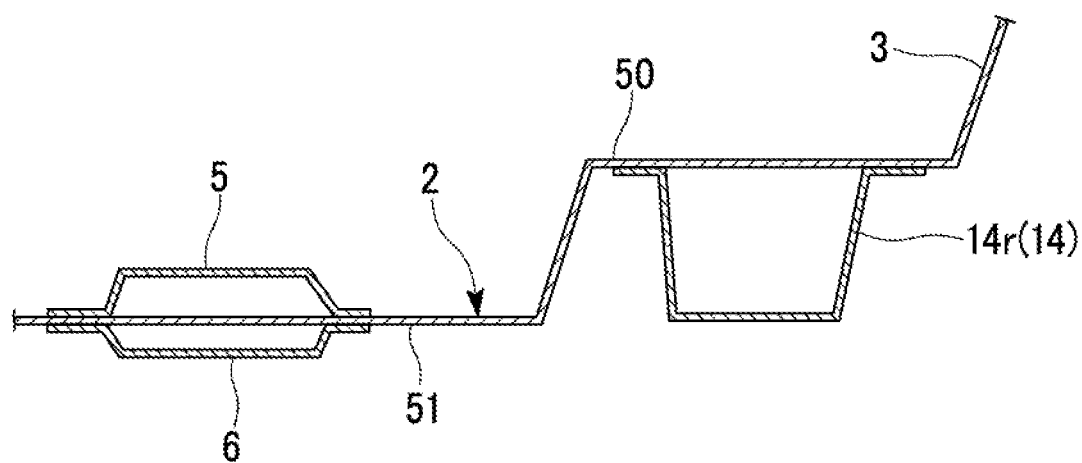
FIG. 16 is a sectional view taken along line C-C of FIG. 13.

FIG. 16 is a sectional view taken along line C-C of FIG. 13. As shown in FIG. 16, the dashboard panel 2 is such that on both sides of the front tunnel portion 3, there is formed a protrusion portion 50 that is slightly lower than the peak portion but one step higher than the flat portion 51. The front end extension portion 14 of the floor center frame 13 is joined to the back side of this protrusion portion 50. The front end extension portion 14 and the rear terminal (not shown in the figure) do not project to the lower side of the flat portion 51 of the dashboard panel 2.

Figure 17:
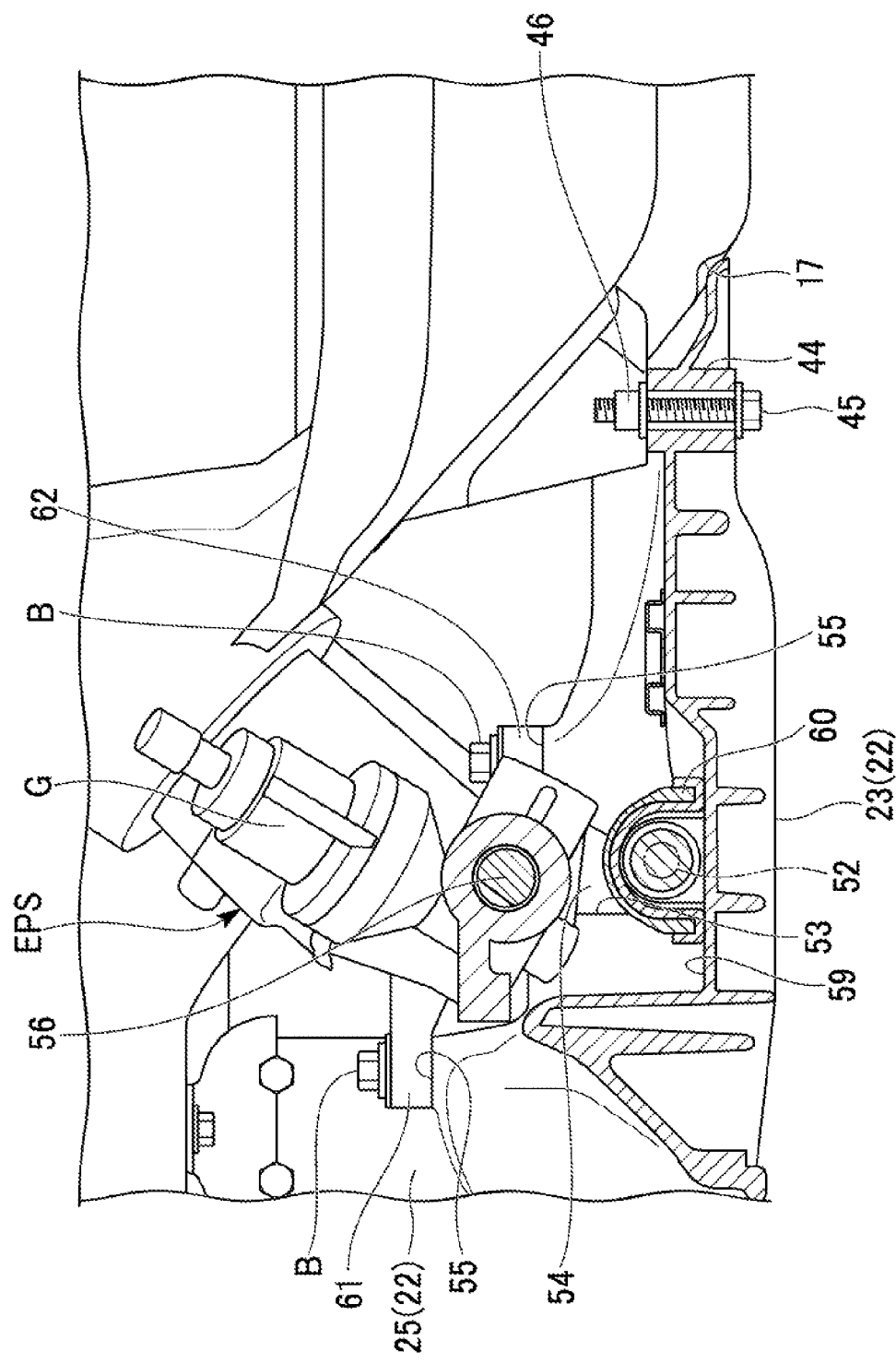
FIG. 17 is a sectional view of the vicinity of a subframe main body.
Figure 18:
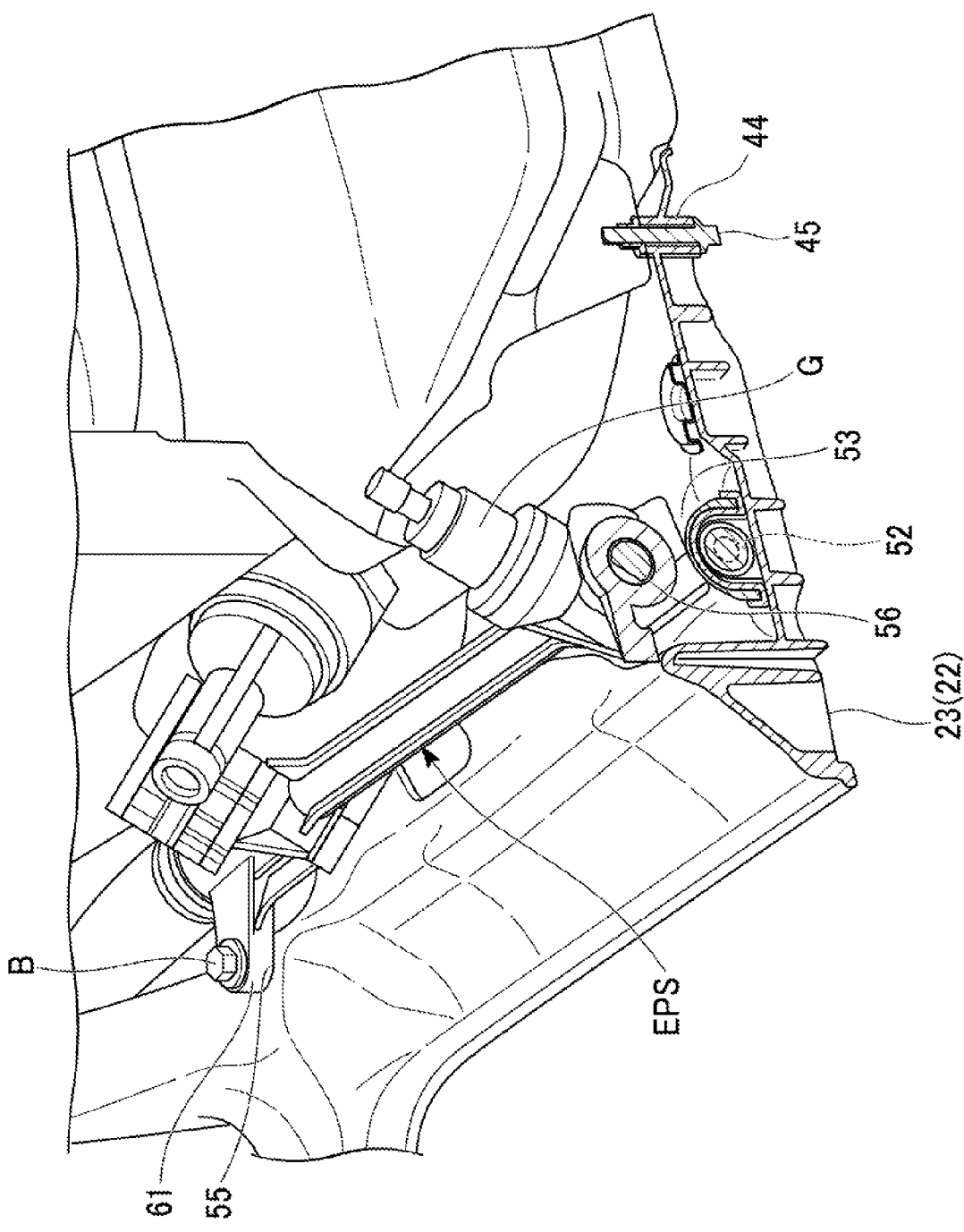
FIG. 18 is a partially cutaway perspective view showing an arrangement state of an electric power steering device.
Figure 19:
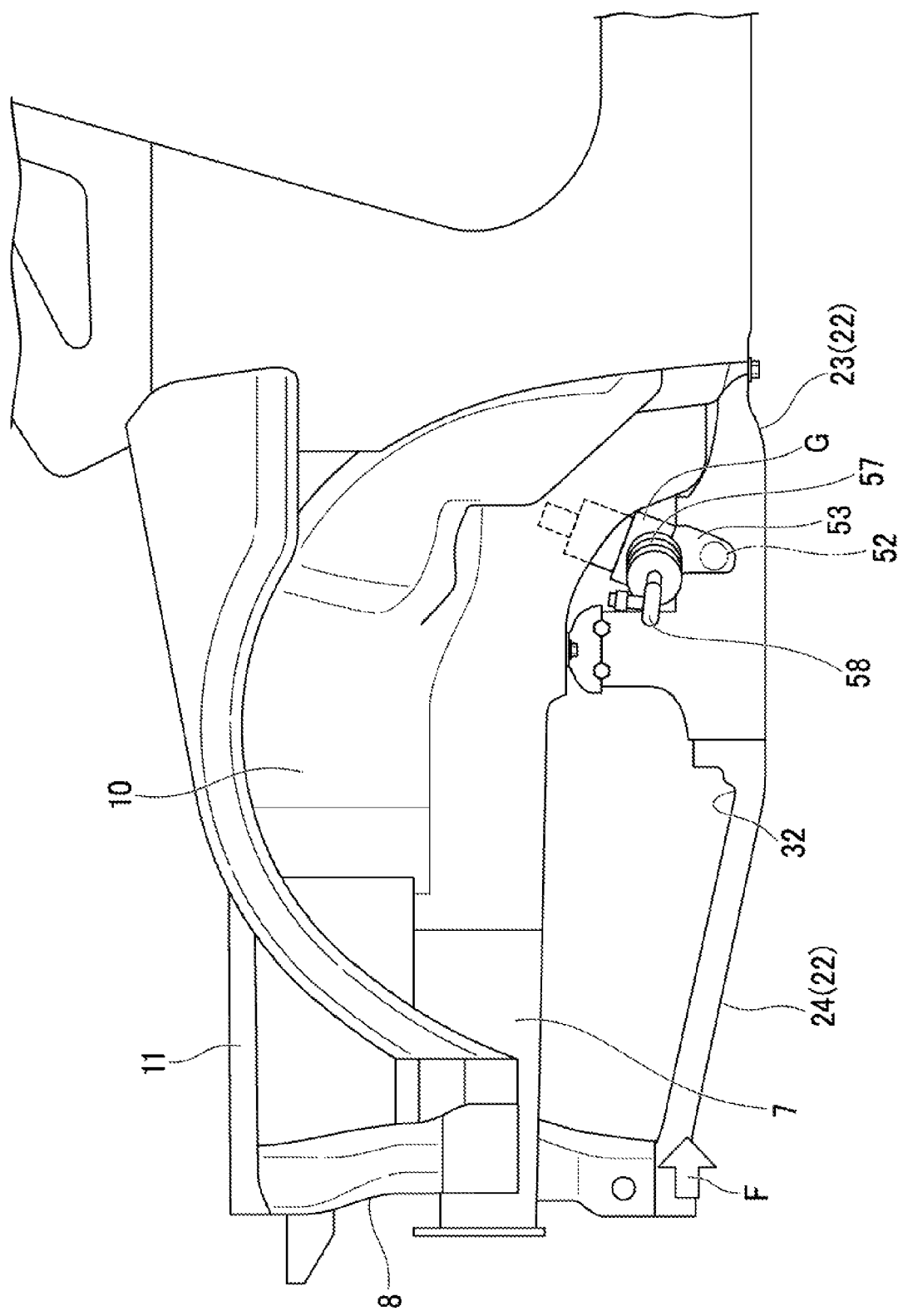
FIG. 19 is a side explanatory view of the vehicle front-end portion.

FIG. 17 is a sectional view of the vicinity of the subframe main body, FIG. 18 is a perspective view showing an arrangement state of the electric power steering device, and FIG. 19 is a side explanatory view of the vehicle front-end portion.

As shown in FIG. 17 through FIG. 19, between the upper attachment arm portion 25 of the subframe main body 23 and the fastening portion 44, there is formed an insertion recess portion 53 for inserting therein a stabilizer 52, which is a suspension component, in the vehicle widthwise direction. This insertion recess portion 53 is formed in a manner such that the lower portion is formed in a sectionally arc shape and the front and rear walls separate from each other with approach to the upper side. Above the insertion recess portion 53, at a position that blocks the opening portion 54 of the insertion recess portion 53, there is provided a steering gear box G of the electric power steering device EPS attached to the upper surface of the subframe main body 23.

That is to say, as described in FIG. 4, the electric power steering device EPS is such that front attachment arms 61 are provided respectively on the left and right front portions; these front attachment arms 61 are fixed to attachment seats 55 on the front side of the insertion recess portion 53 with two bolts B; a rear attachment arm 62 is provided on the rear portion in the vehicle widthwise center; and this rear attachment arm 62 is fixed to the attachment seat 55 on the rear side of the insertion recess portion 53 with a single bolt B. The attachment seats 55 of the subframe main body 23 that receive the front attachment arm 61 and the rear attachment arm 62, which are fixed with the respective bolts B, are provided in front and rear of the insertion recess portion 53 so as to straddle it.

The steering gear box G is a member with heavy weight provided with a torque sensor and a motor, in which immediately above the opening portion 54 there is provided a rack gear 56 that extends left and right, and on the tip end of the rack gear 56 there is attached a tie rod 58 which is protected by a boot 57, as shown in FIG. 19. This tie rod 58 links to a knuckle arm (not shown in the figure).

The stabilizer 52 attached across the left and right lower arms 38 is inserted into the lower portion of the insertion recess portion 53 of the subframe main body 23, and both of the end portions of the stabilizer 52 are rotatably supported on a stabilizer supporting seat 59 of the subframe main body 23 via a bracket 60.

According to the above embodiment, when an impact load is applied in the event of a vehicle frontal collision, this frontal collision load is distributed to the floor center frames 13 which have a high level of strength and rigidity, from the pair of extension arms 24 that are arranged so as to broaden with approach to the front side, via the subframe main body 23.

Here, as shown in FIG. 20, when a frontal collision load (arrow F) above a certain level is applied and a backward load is applied to the lower portion of the front bulkhead 8, the extension arms 24 of the subframe 22 bend downward (arrow U) starting from the recessed portion 32. Therefore, the lower arm 38, which is a suspension component supported on the subframe 22, and an electric power steering device EPS, which is an in-vehicle component, can be displaced downward (arrow D).

Accordingly, the lower arm 38 and the electric power steering device EPS can be retracted to the outside of the crash stroke range of the front side frames 7, and a large vehicle body deformation stroke can be ensured, to thereby sufficiently absorb collision energy. As a result, the steering gear box G of the electric power steering device EPS will not move backward to cause deformation of the dashboard panel 2.

Moreover, since the subframe 22 is provided with a subframe main body 23 that is formed from a light alloy casting, weight reduction can be achieved while increasing supporting rigidity of the suspension components such as the lower arm 38, and improving traveling stability.

Furthermore, since the subframe 22 is provided with a pair of left and right extension arms 24, which are formed from a light alloy or steel by means of press molding, bending deformation of the extension arms 24 in the event of a vehicle frontal collision enables energy absorption at the time of the vehicle frontal collision.

Here, if the extension arms 24 of the subframe 22 are to be bent downward from the recessed portion 32 in the event of a vehicle frontal collision, the upper attachment arm portions 25 of the subframe main body 23 of the subframe 22 receive a downward force, and the separation cutaway 37 of the bolt insertion hole 36 of the connecting bracket 33 that fastens the upper attachment arm portions 25 of the subframe main body 23 and the front side frames 7 breaks (refer to FIG. 11), separating each connecting bracket 33 from the upper attachment arm portions 25. As a result, the upper attachment arm portion 25 of the subframe main body 23 is separated from the front side frames 7, and thereby bending deformation is allowed to occur, starting from the recessed portion 32 of the extension arm 24 of the subframe 22.

In the case where the upper attachment arm portion 25 is displaced downward due to the separation cutaway 37, since a separation cutaway 43 is provided also in the insertion hole 42 of the supporting bolt 40 for the supporting bracket 39 of the lower arm 38 (refer to FIG. 11), the supporting bracket 39 of the lower arm 38 can be displaced downward similar to the subframe main body 23, and it will not obstruct the movement of the subframe main body 23.

Moreover, the power steering device EPS is attached to the upper portion of the subframe main body 23 so that the opening portion 54 of the insertion recess portion 53 for the stabilizer 52, which is a suspension component provided in the subframe main body 23, is blocked by the steering gear box G of the power steering device EPS. As a result, it is possible to prevent deformation in the direction in which the insertion recess portion 53 is closed by the steering gear box G, in a crack starting at the insertion recess portion 53 of the subframe main body 23, which is likely to crack since it is molded from a highly rigid but light metal casting. That is to say, although there is a concern such that the insertion recess portion 53 provided for inserting therein the stabilizer 52, which is a suspension component, in the vehicle widthwise direction may be deformed as a result of stress from the front side concentrating thereon, the opening portion 54 of the insertion recess portion 53 can be blocked by the steering gear box G blocking this. Therefore, stress concentration and crack occurrence are prevented by forming a sectionally closed structure.

Since the extension arms 24 are fixed so as to sandwich the subframe main body 23 from the upper and lower side and press the front side with the rear end attachment portion 27, and the attachment plate 271 is fastened with the fastening bolts 26 at three points that form a triangular shape, even if the extension arms 24 of the subframe 22 are arranged in a manner of broadening with approach to the front side, the extension arms 24 will not rotate horizontally (outward) with respect to the subframe main body 23, and the extension arms 24 can reliably bend downward at the recessed portion 32 when an impact load is applied from the front side.

By means of the rear end attachment portion 27, the extension arms 24 sandwich from the upper and lower sides the front end supporting portion 21 of the lower arm 38, which is provided on the front end portion of the subframe main body 23, while pressing the front thereof. Therefore, it is advantageous in that the supporting portion 21 at the rear end of the lower arm 38, which is a strong portion, can support an impact load that is applied in the event of a vehicle frontal collision.

Moreover, since the extension arm 24 is fixed in a state of extending forward along the bottom surface of the subframe main body 23, the center of mass of the subframe main body 23 is positioned higher than the center of mass of the extension arms 24 so that the subframe main body 23 can cause the moment that rotates upward the portion of the extension arms 24 to act at the rear of the recessed portion 32. Furthermore, the front end attachment portion 29 of the extension arms 24 is arranged higher than the rear end attachment portion 27. As a result, the extension arms 24 can be reliably bent downward.

Moreover, it is possible to ensure a sufficient engine arrangement space above the extension arms 24 of the subframe 22.

Since the tip end of the extension arm 24 is connected to both end corners of the lower portion of the front bulkhead 8, it is possible, by means of the subframe 22, to increase the rigidity of the front bulkhead 8.

There has been described the case where a separation cutaway 37 of the fixation bolt 34 is provided in the bolt insertion hole 36 on the connecting bracket 33 side while leaving the connecting bracket 33 on the upper side. However, a separation cutaway may be provided in the bolt insertion hole of the fixation bolt 34 of the upper attachment arm portion 25, and this separation cutaway of the upper attachment arm portion 25 may be broken, as long as the upper attachment arm portion 25 can move downward. Moreover, a rivet may be used instead of a fastening bolt 26.

Next, a second embodiment of the present invention is described, based on the figures. In the following description, descriptions of similar constituents may be simplified or omitted. Moreover, in the second embodiment, constituents and descriptions thereof are similar to those in the first embodiment unless specific description is provided.

Figure 21:
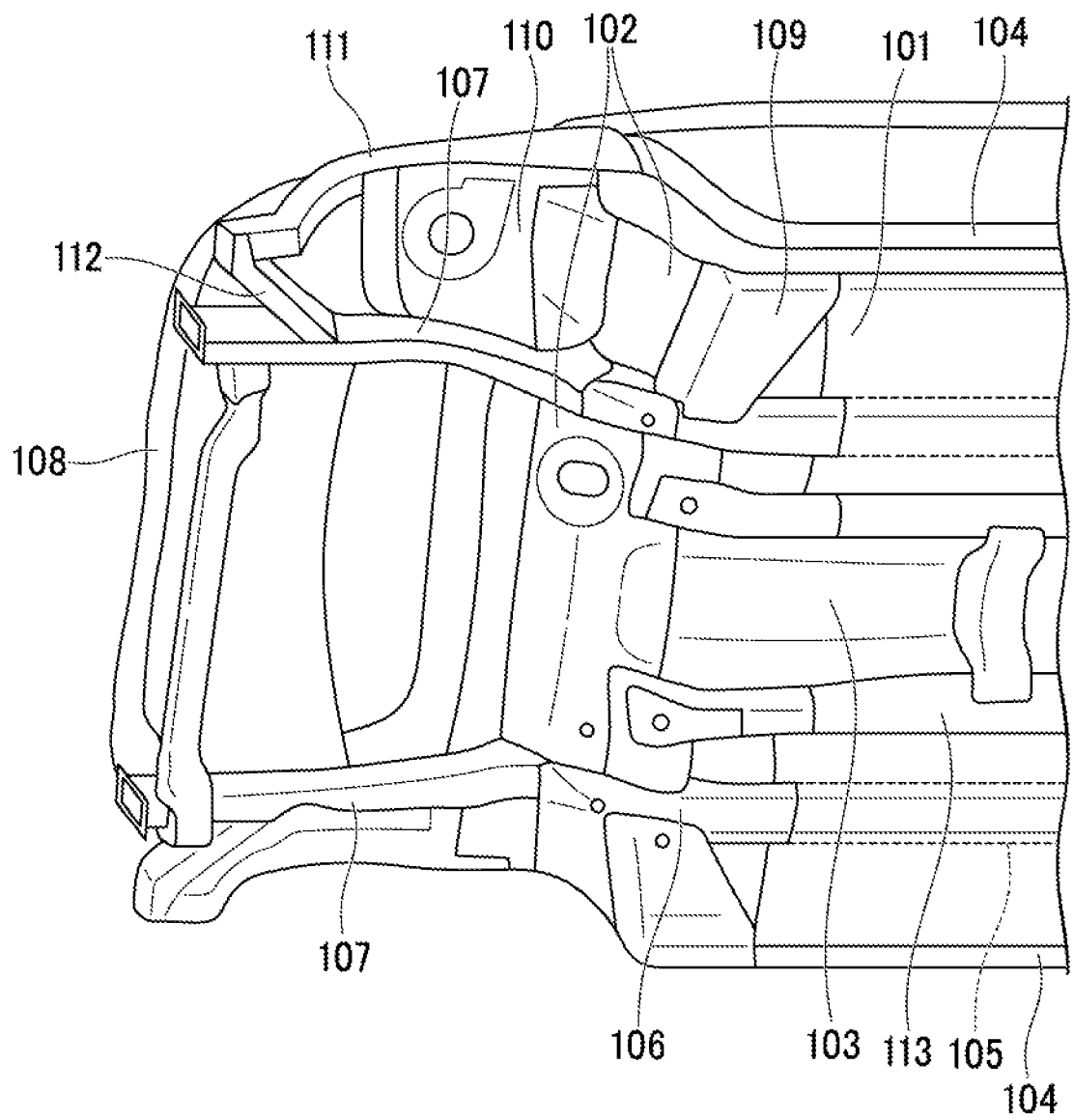
FIG. 21 is a perspective view of a vehicle front-end portion of a second embodiment according to the present invention, seen from the lower side.

FIG. 21 is a perspective view of a vehicle front-end portion, seen from the lower side. As shown for the vehicle front-end portion in FIG. 21, to a front end portion of a front floor panel 101, there is connected a rear end portion of a dashboard panel 102. The dashboard panel 102 is such that the rear end portion thereof is formed flat as with the front floor panel 101, and the front side thereof rises with approach to the diagonally front side so as to separate the vehicle cabin from the engine room. The flat portion of the dashboard panel 102 and also the portion that starts to rise on the front side, are configured together as the front floor panel 101.

In the front floor panel 101, at the vehicle widthwise center portion, there is formed a floor tunnel portion 103 that expands along the lengthwise direction to the vehicle cabin inner side. This floor tunnel portion 103 extends toward the rear end portion of the dashboard panel 102, and is connected to a cutaway portion of the rear end portion of the dashboard panel 102.

Figure 36:
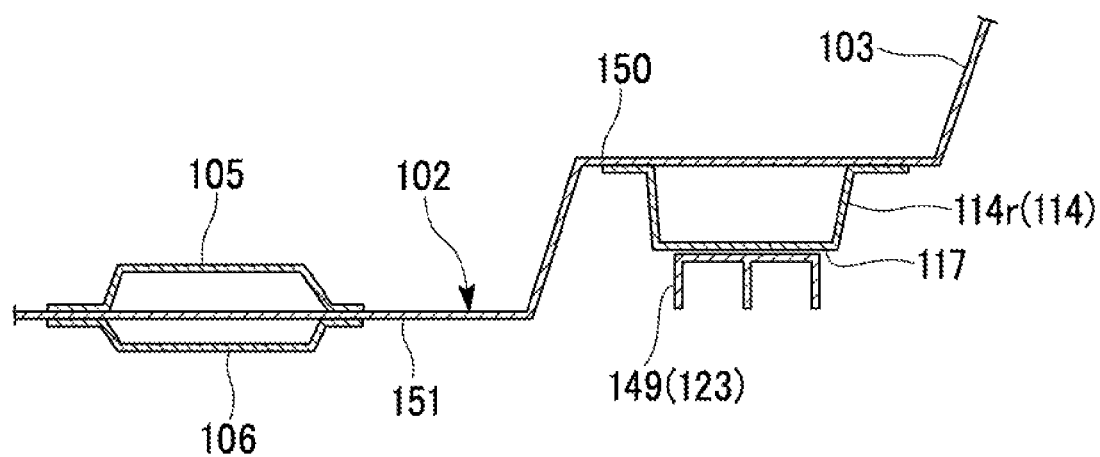
FIG. 36 is a sectional view taken along line C-C of FIG. 33.

The floor tunnel portion 103 (and also similarly the dashboard panel 102) is such that it is not formed descending from the apex portion directly to the height of the front floor panel 101, but there is formed a slightly lower portion that is one step lower than the peak portion, and it then continues to the flat portion of the front floor panel 101 (refer to FIG. 36). Side seals 104 are attached to both sides of the front floor panel 101, and between the side seals 104 and the floor tunnel portion 103, along the vehicle lengthwise direction, there are provided sectionally hat-shaped floor frames 105 (shown with dashed lines) that are respectively joined to the upper surface of the flat portion of the front panel 101 and that form a sectionally closed structure portion.

A front side frame rear end 106 is joined to the lower surface of the dashboard panel 102 so as to overlap with the front end portion of the floor frame 105 from the lower side. At a position slightly higher than the flat portion of the front floor panel 101, as a framework structure of the engine room, front side frames 107 are joined to the front end portion of this front side frame rear end 106 along the vehicle lengthwise direction on the left and right sides of the vehicle front-end portion.

On the front end portion of the pair of left and right front side frames 107, a rectangular frame-shaped front bulkhead 108 is attached to side stays 108*s* (refer to FIG. 24) that extend vertically. Between the front side frame rear end 106 and the front end portion of the side seal 104, there is connected an outrigger 109, and a wheelhouse 110 is connected to the front end portion of the dashboard panel 102 positioned on the front side of the outrigger 109.

On the upper side of the wheelhouse 110, there is joined a wheelhouse upper member 111; on the front end portion of the wheelhouse upper member 111, there is joined the front end portion of a wheelhouse lower extension 112; and the rear end portion of the wheelhouse lower extension 112 is joined to the side portion of the front side frame 107.

On the lower surface of the front floor panel 101 there are attached sectionally hat-shaped floor center frames 113 that extend along the vehicle lengthwise direction on both sides of the floor tunnel portion 103 and that form a sectionally closed structure portion on the lower surface of the front floor panel 101.

Figure 22:
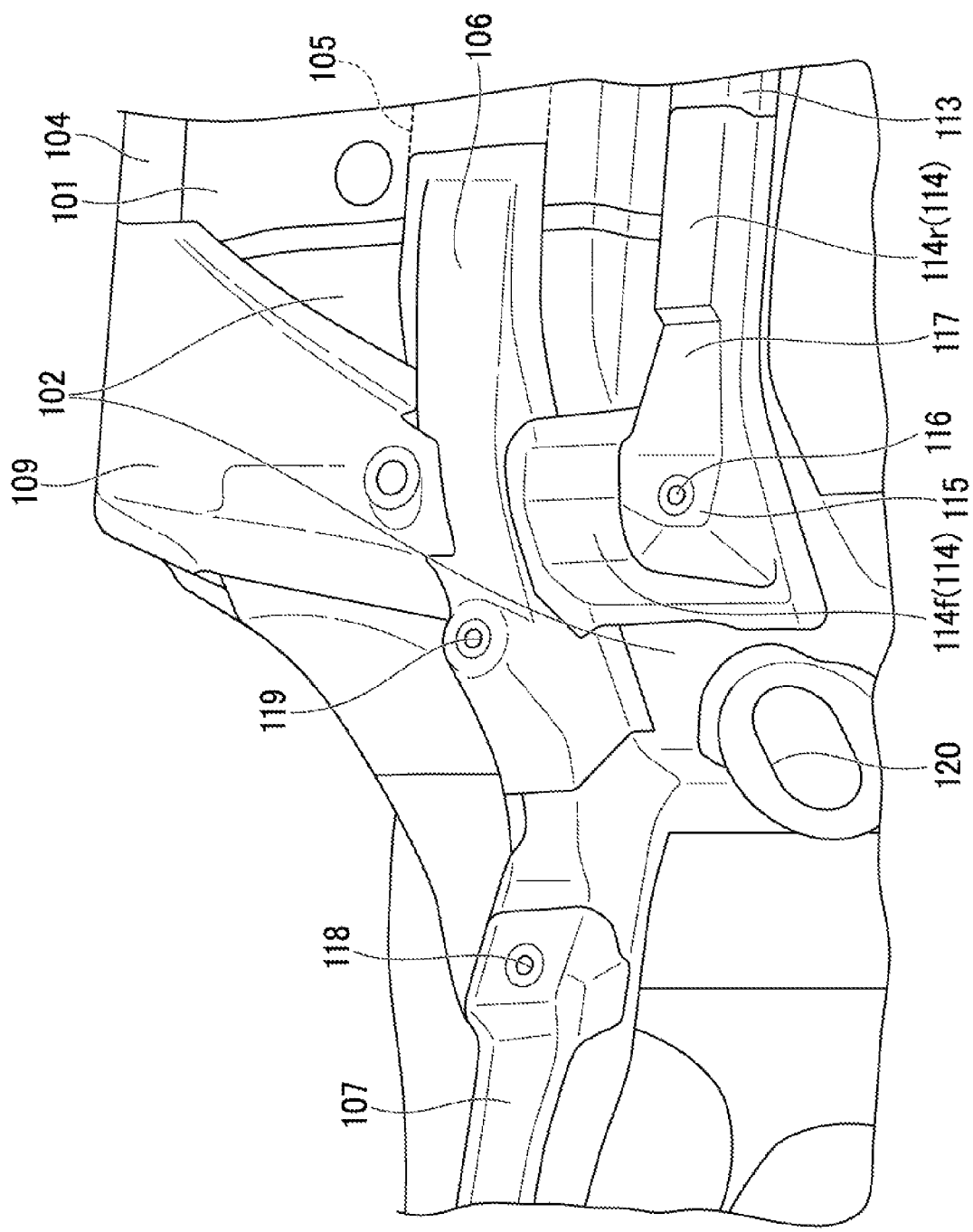
FIG. 22 is an enlarged perspective view of a relevant portion of FIG. 21.

FIG. 22 is an enlarged perspective view of the relevant portion of FIG. 21, showing an enlarged view of the left front side of the front floor panel 101 seen from the lower side. In FIG. 22, the front side frame rear end 106 is a sectionally hat-shaped member; it forms a sectionally closed structure on the lower side of the joint portion between the front floor panel 101 and the dashboard panel 102; the rear end portion is joined to the front end portion of the floor frame 105 (shown with dashed line) at a position that overlaps from the lower side; and the front end portion is connected to the rear end portion of the front side frame 107.

Therefore, by means of this front side frame rear end 106, the front side frame 107 of a sectionally closed structure and the floor frame 105 (shown with dashed line) that forms a sectionally closed structure portion on the front floor panel 101, are connected by the sectionally closed structure portion.

The front end portion of the floor frame 105 and the rear end portion of the front side frame rear end 106 have portions that overlap with each other while having the front floor panel 101 therebetween, and in the portion where they overlap with another portion, they are formed so that the sectional area thereof becomes smaller with approach to the tip end portion, to be joined to the front side and back side of the front floor panel 101.

The outrigger 109 overlaps on the vehicle widthwise outer side of the front side frame rear end 106 from the lower side (upper side in FIG. 22), across the bottom wall portion of each front side frame rear end 106 and each side seal 104. The outrigger 109 is joined to the lower surface of each side seal 104 so as to straddle the border portion between the front floor panel 101 and the dashboard panel 102, in the vehicle widthwise outer side portion.

An L-shaped front end extension portion 114 is joined to the front end portion of each floor center frame 113 from the lower side (upper side in FIG. 102), across the front floor panel 101 and the dashboard panel 22. This front end extension portion 114 comprises a rear portion 114*r* that is formed in a sectionally hat-shape to overlap on the floor center frame 113 and form a sectionally closed structure portion, and a front joint portion 114*f* that continues to this rear portion 114*r* while bending outward and that similarly forms a sectionally closed structure portion. The front joint portion 114*f* extends outward in the vehicle widthwise direction from the front end of the rear portion 114*r*, and the widthwise outer side portion of the periphery flange portion is joined to the inner wall of the front side frame rear end 106. By means of this front end extension portion 114 having the front joint portion 114*f*, the floor center frame 113 and the front side frame 107 are connected by the sectionally closed structure portion.

The front joint portion 114*f* is provided with a subframe rear end attachment seat 115 facing downward toward the front end side. This subframe rear end attachment seat 115 is provided at a position lower than the height of the floor center frame 113 in FIG. 22 (ground height is higher), and a recess portion 117 that protrudes less than the rear side of the front joint portion 114f is formed on the front side of the front joint portion 114f so as to be adjacent to the rear portion of this subframe rear end attachment seat 115. In the subframe rear end attachment seat 115, there is formed a bolt hole 116, and the recess portion 117 receives a rear end extension portion 149 of a subframe main body 123 of a subframe 122 described later (refer to FIG. 33).

Here, a subframe intermediate joint hole 118 is formed in the rear end portion of the front side frame 107, and a rear end supporting bracket outer attachment hole 119 of the lower arm is formed at the front end portion of the front side frame rear end 106. In the dashboard panel 102, on the front side of the front end extension portion 114, there is formed a steering shaft insertion hole 120.

Figure 23:
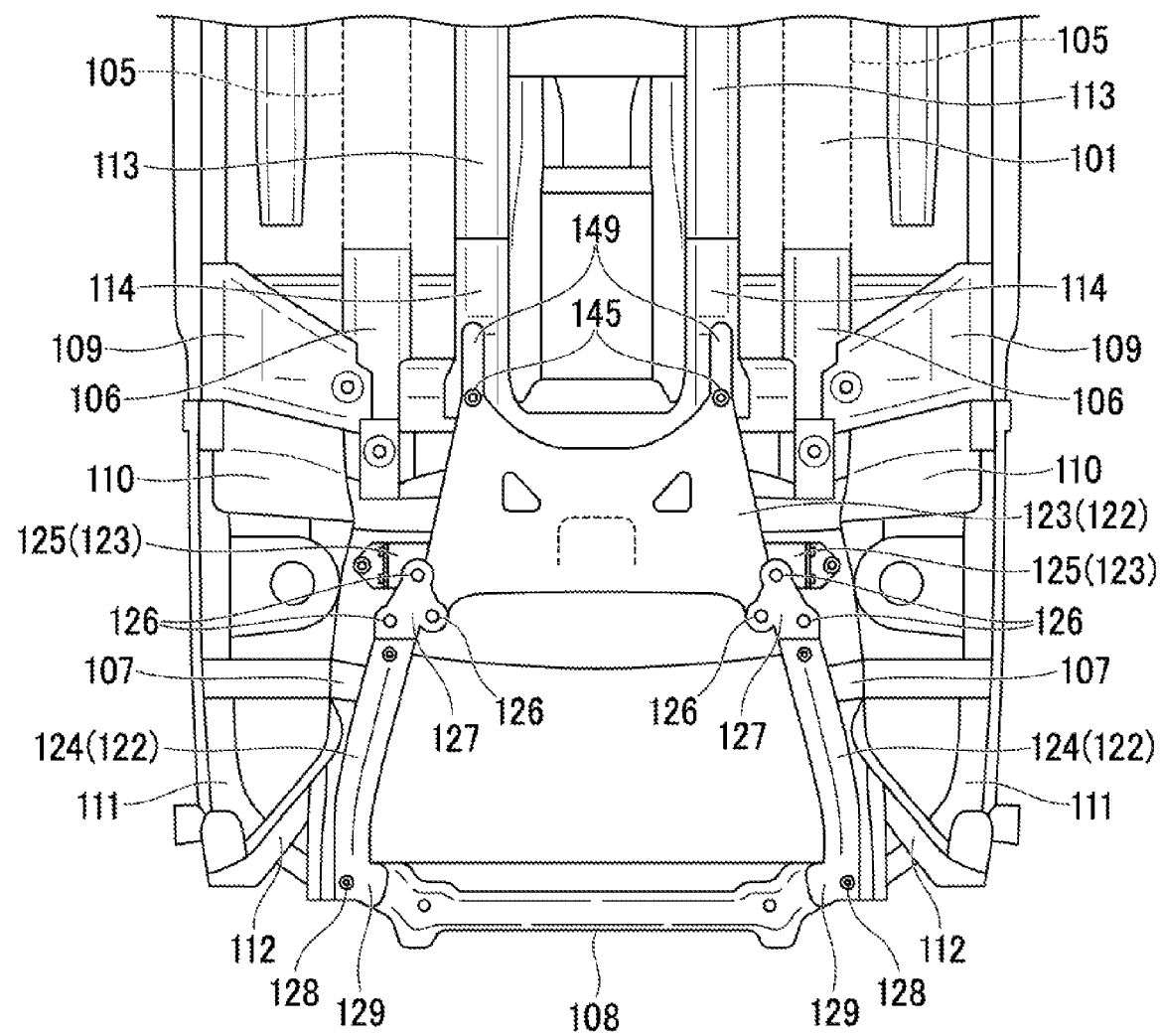
FIG. 23 is a bottom view of the vehicle front-end portion seen from the lower side.
Figure 24:
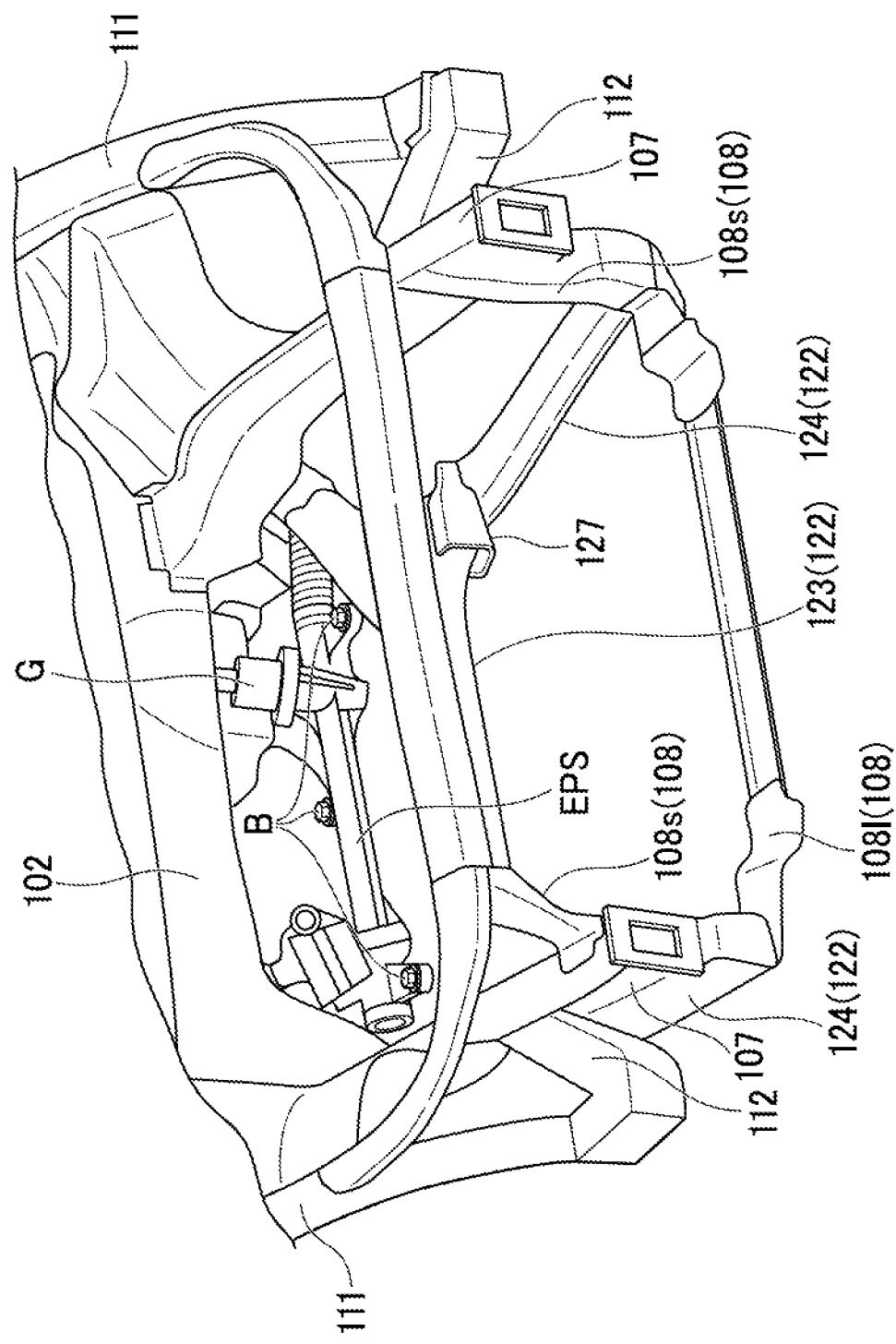
FIG. 24 is a perspective view of the vehicle front-end portion seen from the diagonally upper right side.
Figure 25:
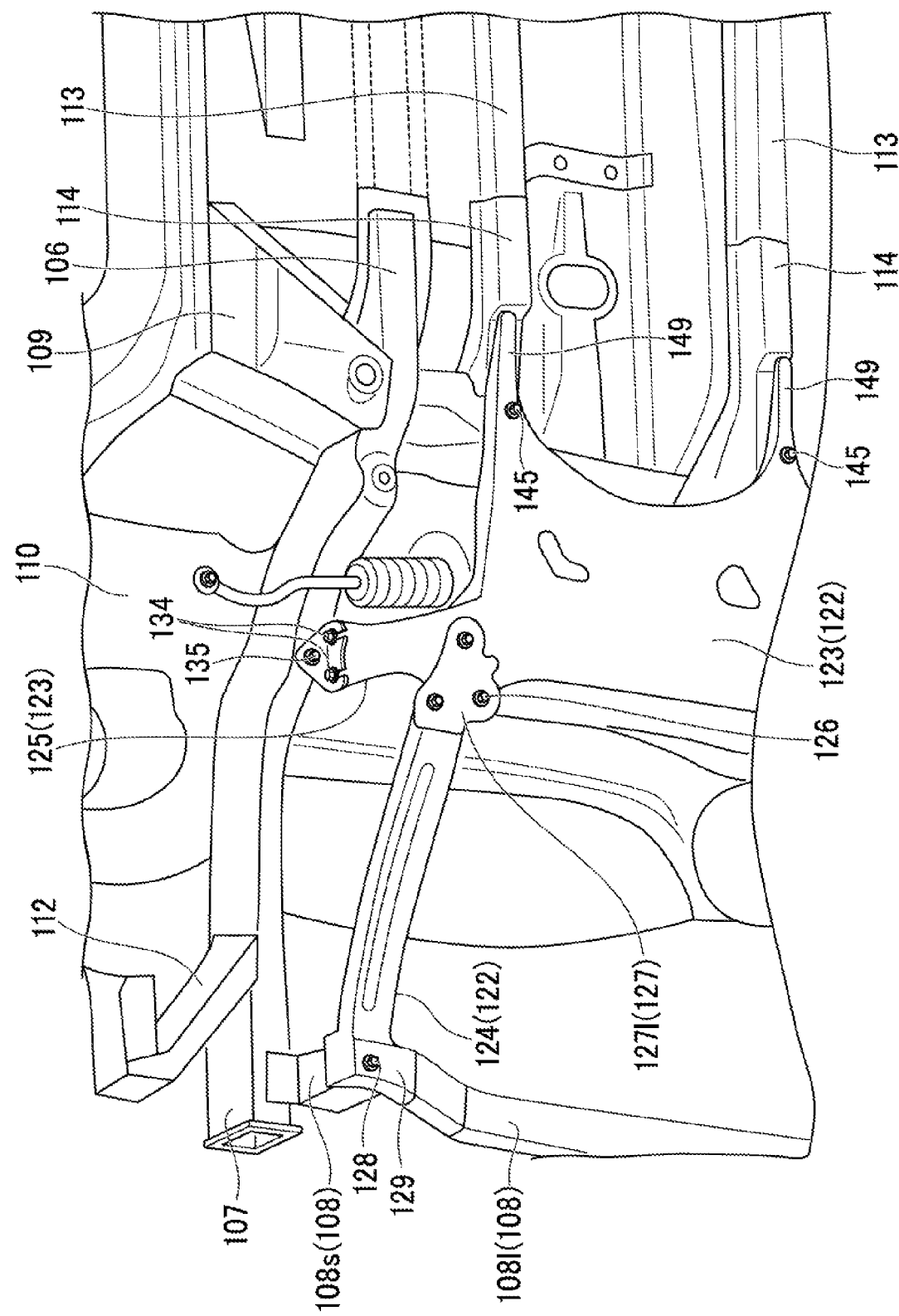
FIG. 25 is a perspective view of the left side of the vehicle front-end portion seen from the lower side.

FIG. 23 through FIG. 25 each shows a state with the subframe attached. FIG. 23 is a bottom view of the vehicle front-end portion seen from the lower side, FIG. 24 is a perspective view of the vehicle front-end portion seen from the diagonally right upper side, and FIG. 25 is a perspective view of the vehicle front-end portion left side seen from the lower side.

As shown in FIG. 23 through FIG. 25, across the front side frames 107 and the front portion of the front floor panel 101, the subframe 122 that supports; a lower arm, suspension components including the tire, and an electric power steering device EPS (described later), is supported at the front end portion, the rear end portion, and the lengthwise center portion. Specifically, the subframe 122 is fixed across both lower end corner portions of the front bulkhead 108 attached to the front side frames 107 and the front end extension portion 114 of the front end of the floor center frame 113 attached to the front floor panel 101.

The subframe 122 includes a trapezoidal subframe main body 123 cast from an aluminum alloy, and a pair of left and right extension arms 124 that broaden and extend forward from the front end both side portions of the subframe main body 123. The electric power steering device EPS is fixed with bolts B at positions in front of the front end extension portion 114, which are three locations in the vehicle widthwise direction on the subframe 122, that is, the upper surface of the subframe main body 123, as shown in FIG. 24. In FIG. 24, a steering gear box G is provided on the left side of the electric power steering device EPS, and the steering gear box G is arranged in the vicinity of and on the lower side of the steering shaft insertion hole 120.

The subframe main body 123 is a substantially trapezoidal member having, when seen on the plan view, a rear edge that bends forward, left and right side edges that open outward toward the front side and that extend linearly, and a front edge that linearly extends in the vehicle widthwise direction. The subframe main body 123 is such that the upper surface thereof is flat; a plurality of intersecting vertical ribs (refer to FIG. 31 and FIG. 32) for increasing rigidity are provided on the lower surface; and on both end portions of the subframe main body 123 there is provided an upper attachment arm portion 125 that extends upward.

Figure 26:
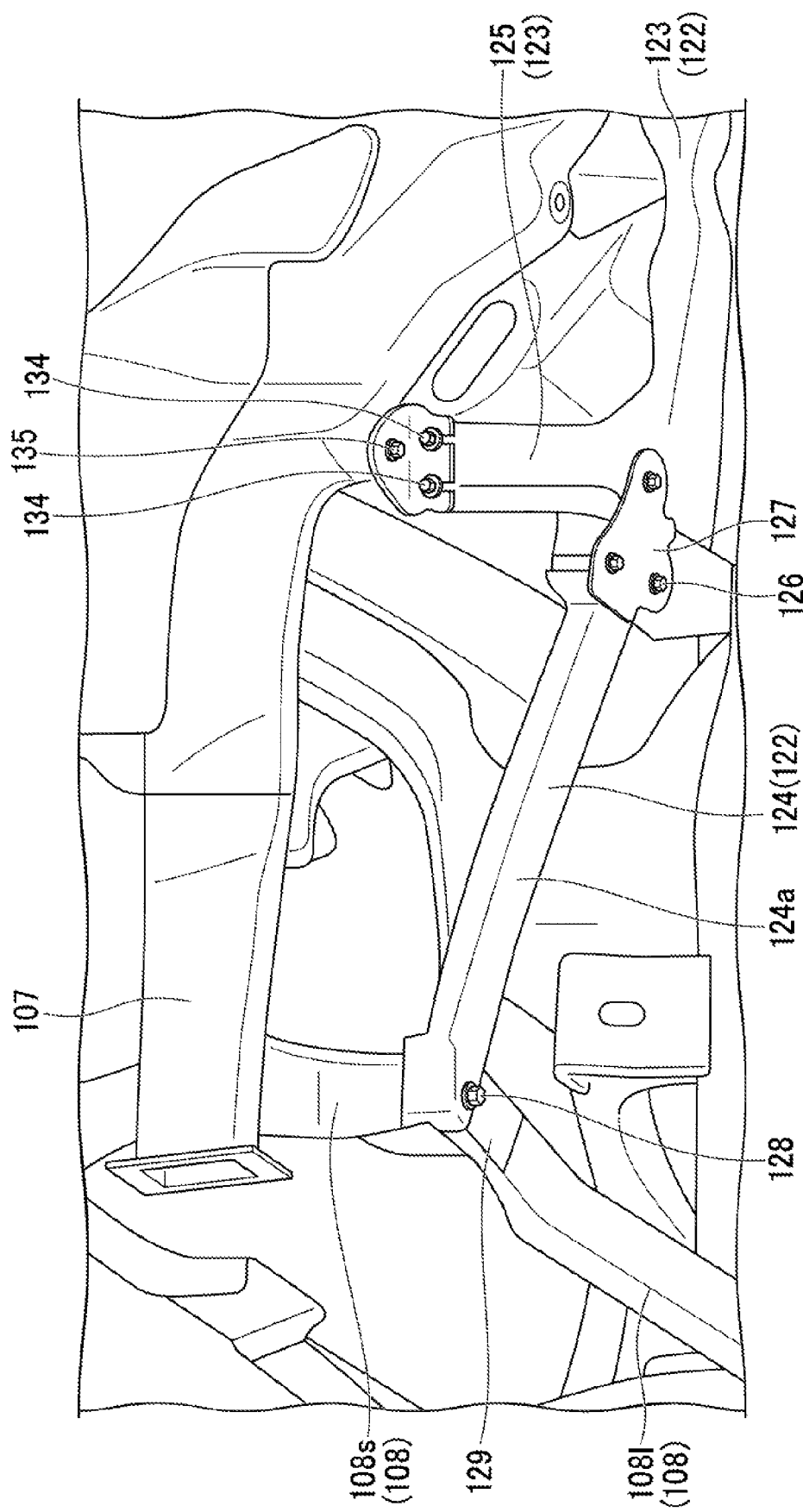
FIG. 26 is a perspective view of the vehicle front-end portion seen from the diagonally lower left outer side.
Figure 27:
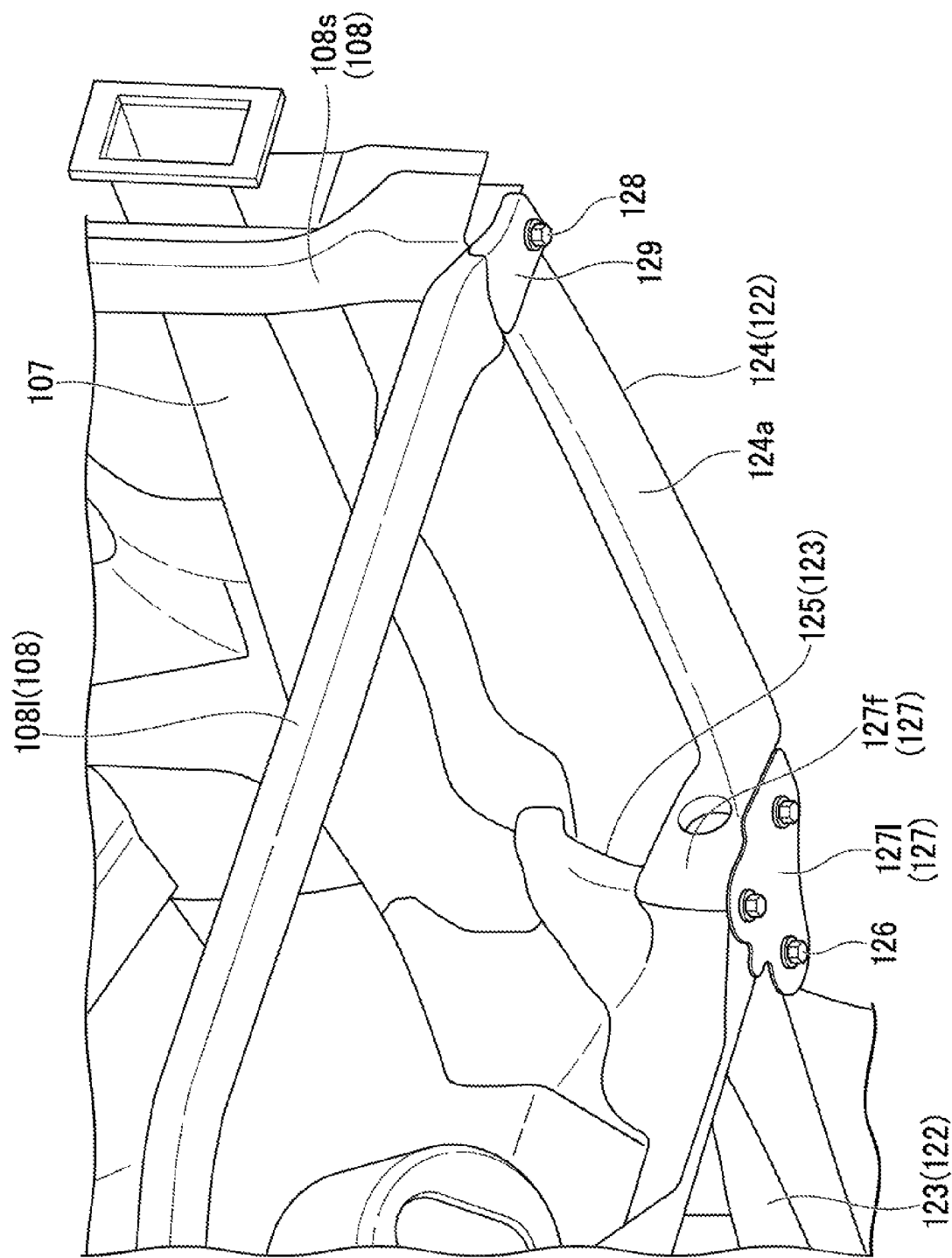
FIG. 27 is a perspective view of the vehicle front-end portion seen from the diagonally front right lower side.
Figure 28:
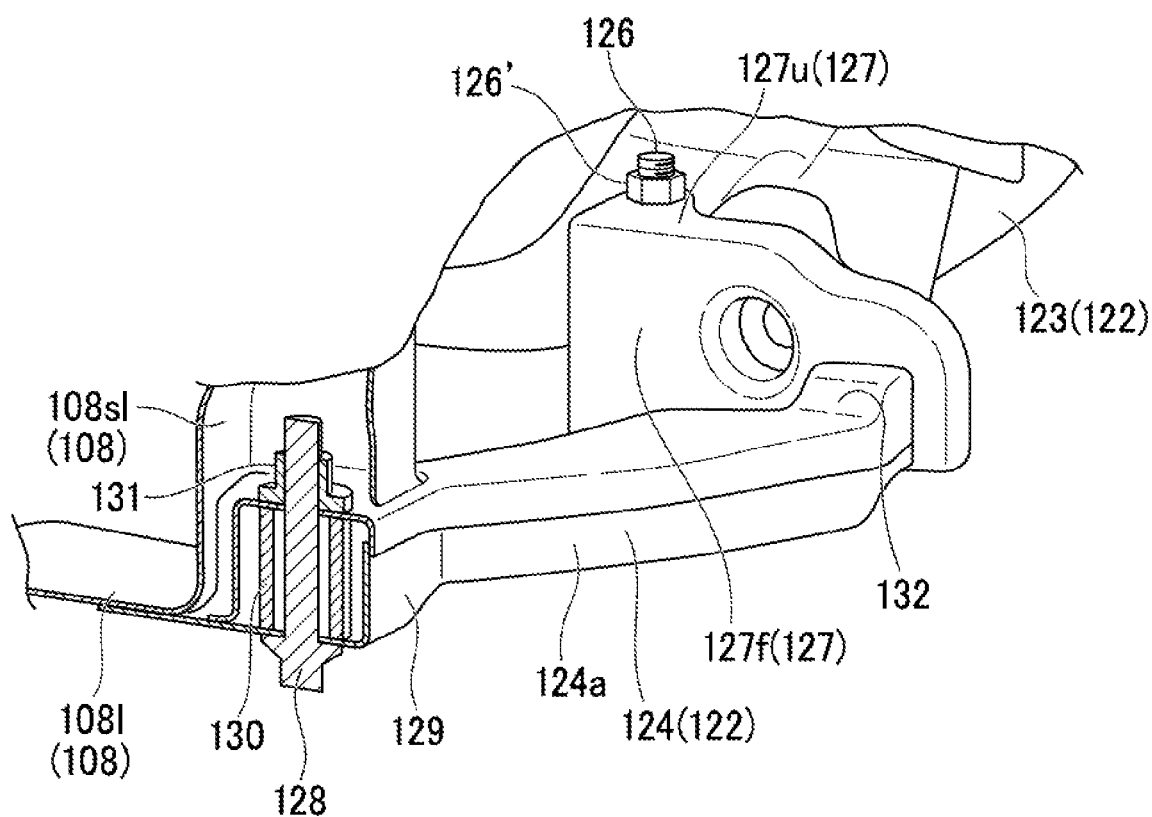
FIG. 28 is a perspective view of an attachment portion of an extension arm, seen from the left front diagonally front side.
Figure 29:
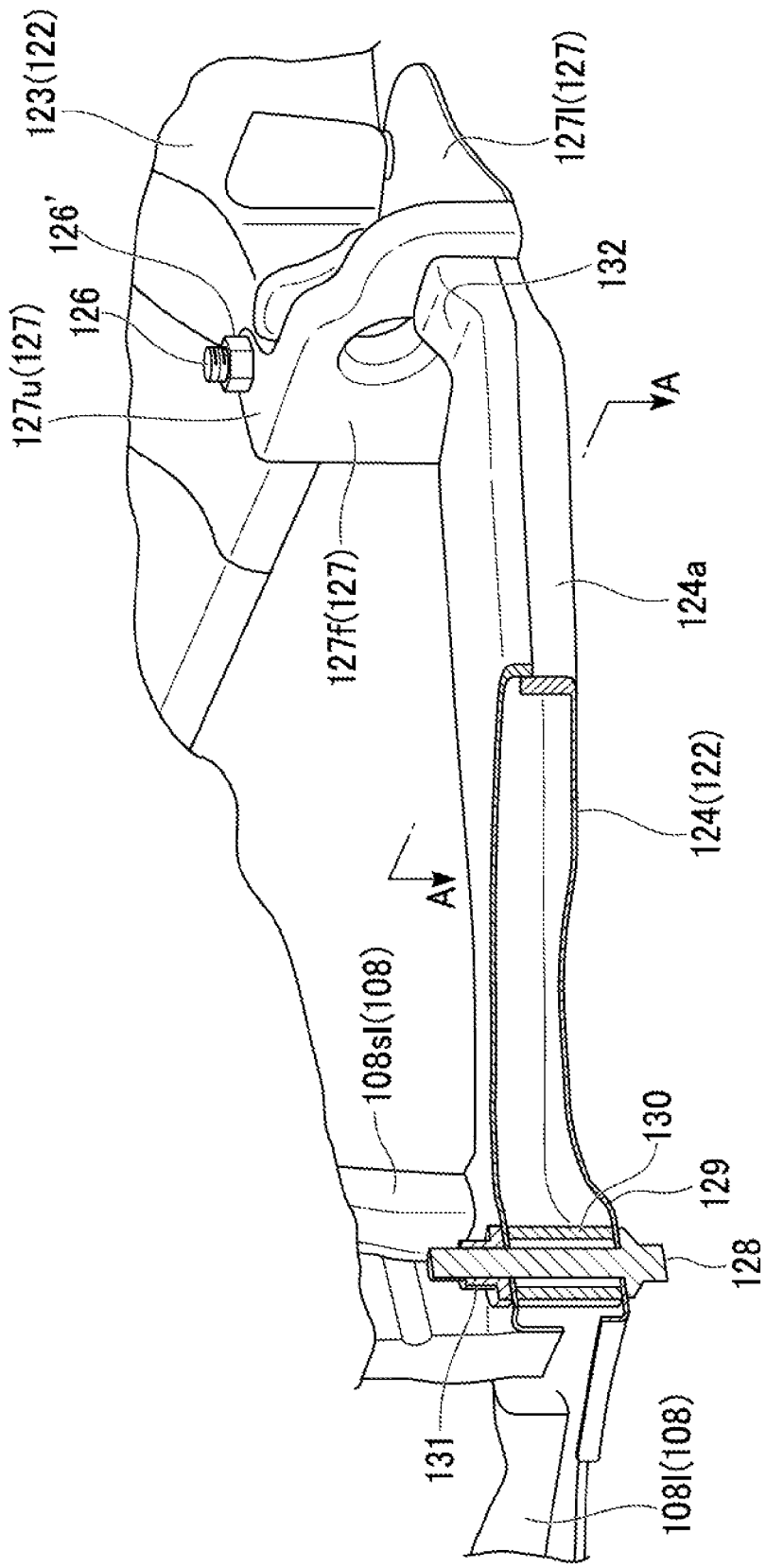
FIG. 29 is a perspective view of the attachment portion of the extension arm, seen from the left slightly diagonally front side.

FIG. 26 is a perspective view of the vehicle front-end portion seen from the diagonally lower left outer side, FIG. 27 is a perspective view of the vehicle front-end portion seen from the diagonally front right lower side, FIG. 28 is a perspective view of the extension arm attachment portion seen from the left front diagonally front side, and FIG. 29 is a perspective view of the extension arm attachment portion seen from the left slightly diagonally front side.

As shown in FIG. 26 through FIG. 29, the extension arms 124 include an extension arm main body 124a, a rear end attachment portion 127 provided on the rear end portion of the extension arm main body 124a, and a front end attachment portion 129 provided on the front end portion of the extension arm main body 124a.

The rear end attachment portion 127 comprises an attachment plate 1271 that supports the front corner portion of the subframe main body 123 from the lower side, an upper attachment piece 127u on the upper side, and a front wall 127f that connects these members.

The attachment plate 1271 is fastened and fixed with three fastening bolts 126 in screw holes (boss shape thereof being integrally formed) of the subframe main body 123 so as to form a triangular shape from the lower side, and the upper attachment piece 127u is fastened and fixed with a nut 126' on a single fastening bolt 126 inserted therethrough from the lower side. By means of this rear end attachment portion 127, the extension arms 124 are fixed so as to sandwich the subframe main body 123 from the upper and lower sides and press the front side. Here, the attachment plate 1271 has an area larger than that of the upper attachment piece 127u and extends backward, and the upper attachment piece 127u is formed on the upper inner side of the rear end attachment portion 127. The upper portion of the rear end attachment portion 127 extends outward from the upper attachment piece 127u, and the height thereof then gradually reduces (refer to FIG. 28), eventually descending downward. To the area near the outer side on the front wall 127f of the rear end attachment portion 127, there is connected the rear end portion of the extension arm 124a.

Since the extension arms 124 are fixed by means of this rear end attachment portion 127 so as to sandwich the subframe main body 123 from the upper and lower side and press the front side with the rear end attachment portion 127, and the attachment plate 1271 is fastened at three points that form a triangular shape, even if the extension arms 124 of the subframe 122 are arranged in a manner of broadening with approach to the front side, the extension arms 124 can reliably bend downward at the recessed portion 132 described later when an impact load is applied from the front side.

The front end attachment portion 129 of the extension arms 124 is arranged at a position higher than the rear end attachment portion 127 (ground height), and it is fastened and fixed with a fixation bolt 128 to the front end portion of the extension arm main body 124a at the lower corner portion of the front bulkhead 108, that is, to the joint portion of a side stay 108s and a lower cross 108l. The front end attachment portion 129 is fastened and fixed from the lower side with a fixation bolt 128 and a nut 131 via a collar 130. The tip end lower piece of the front end attachment portion 129 is fastened to the lower surface of the lower cross 108l of the front bulkhead 108.

Figure 30:
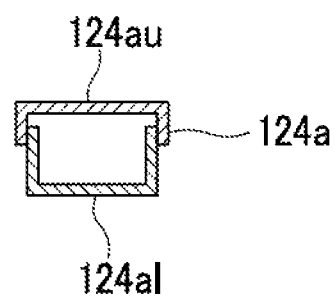
FIG. 30 is a sectional view taken along line A-A of FIG. 29.

The extension arm main body 124a is formed in a sectionally closed structure in which a sectionally open-shaped lower member 124a1 that is open on the upper side thereof is inserted from the lower side into a sectionally open-shaped upper member 124au that is open on the lower side thereof (refer to FIG. 30).

In the rear end portion of the extension arm main body 124a, on the slightly front side of the rear end attachment portion 127 that is attached to the front wall 127f, there is formed a recessed portion 132. This recessed portion 132 is a portion that appears constricted on the side view, and it usually does not bend in any way. However, it is a starting point of downward bending midway along the lengthwise direction with a predetermined input load in the event of a vehicle frontal collision. This recessed portion 132 forms a weakened starting portion at which the extension arm main body 124a, that is, the extension arm 124, starts to bend.

Here, the recessed portion 132 is formed at a position lower than the front end attachment portion 129 of the extension arm 124. Moreover, the subframe 122 is provided with the upper attachment arm portion 125 in the rear portion of the recessed portion 132. Both the upper member 124au and the lower member 124a1 are tapered to form the recessed portion 132.

Figure 31:
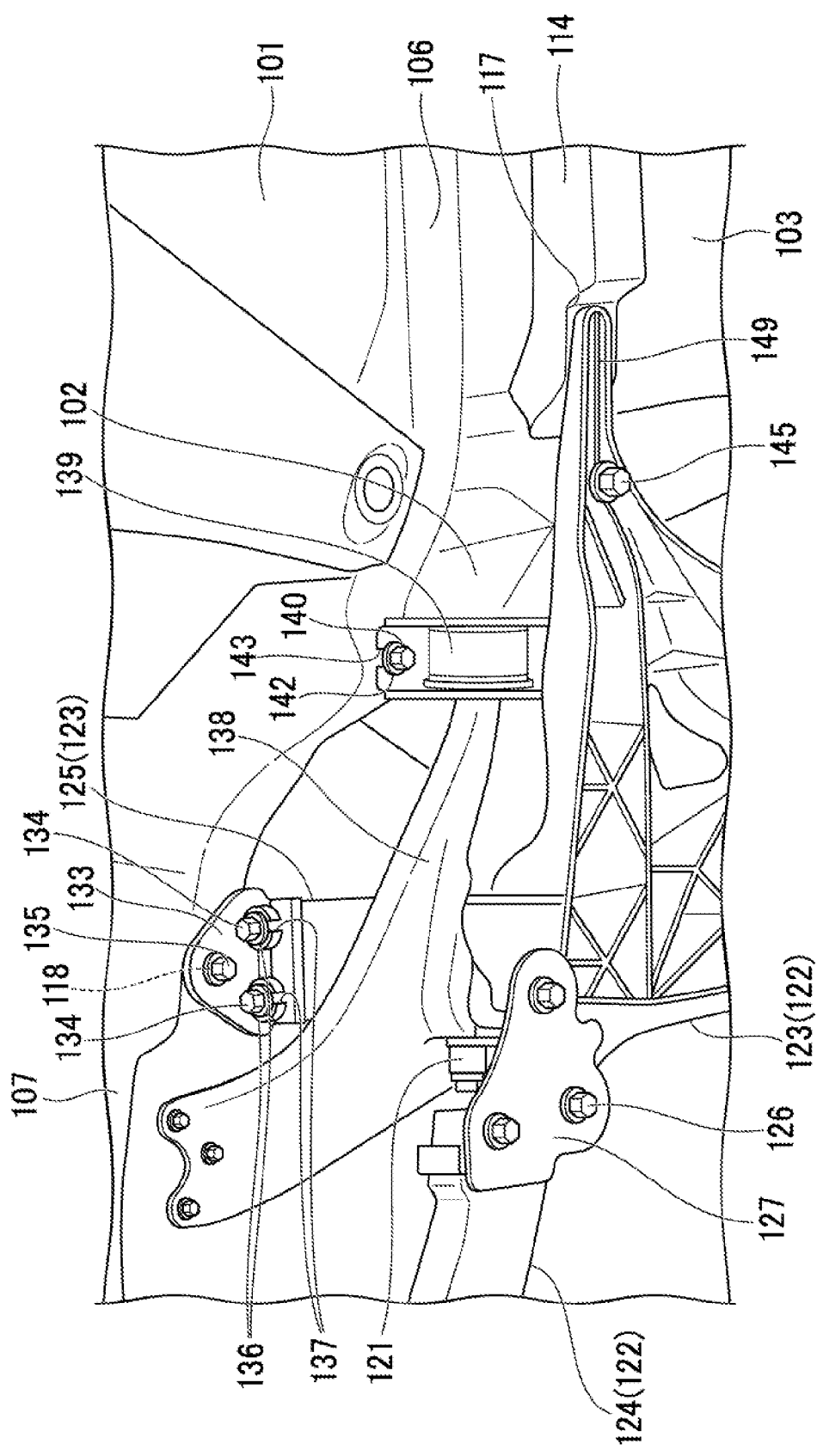
FIG. 31 is a perspective view showing a state with the lower arm attached, seen from the diagonally left lower side.

As shown in FIG. 31, a connecting bracket 133 is fixed to the upper end portion of the upper attachment arm portion 125 of the subframe main body 123 with two fixation bolts 134 from a side thereof. This connecting bracket 133 is fastened and fixed with a fastening bolt 135 that is inserted upward into the subframe intermediate joint hole 118 (refer to FIG. 22) of the rear end portion of the front side frame 107.

Here, in bolt insertion holes 136 of the connecting bracket 133, into which the fixation bolts 134 are inserted, there is provided a separation cutaway 137, which is a partial cutaway of the lower side thereof. As a result, in the case where the extension arms 124 bend downward from the recessed portion 132 serving as a bending starting point, if a downward load is applied, the fixation bolts 134 are separated from the connecting bracket 133 while leaving the connecting bracket 133 with the front side frame 107, to allow the upper attachment arm portion 125, that is, the subframe main body 123, to displace downward. Therefore, the size of the separation cutaway 137 is determined to correspond to the load that is applied when the subframe main body 123 is bent.

Figure 32:
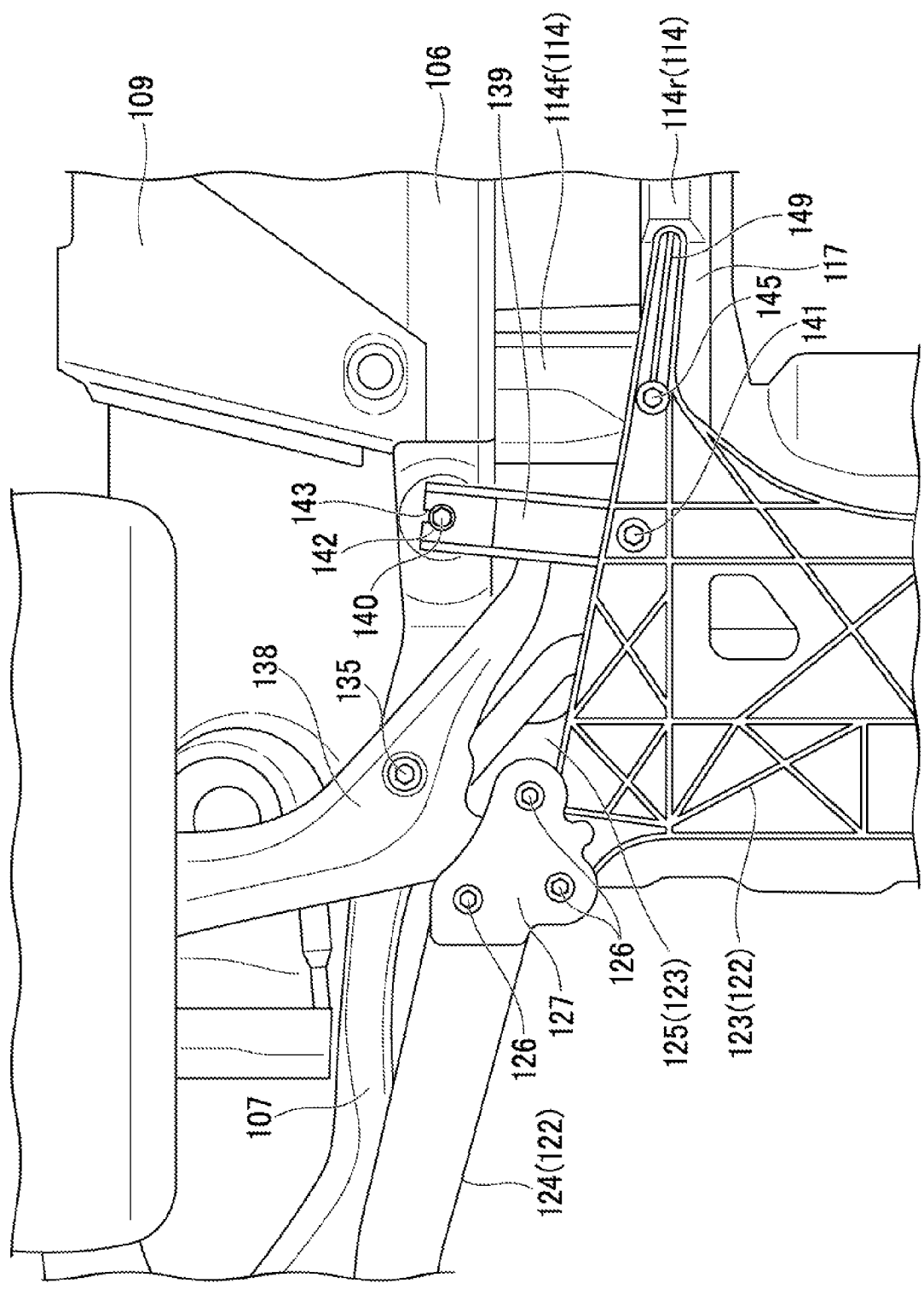
FIG. 32 is a bottom view of a relevant portion showing a state with the lower arm attached.
Figure 33:
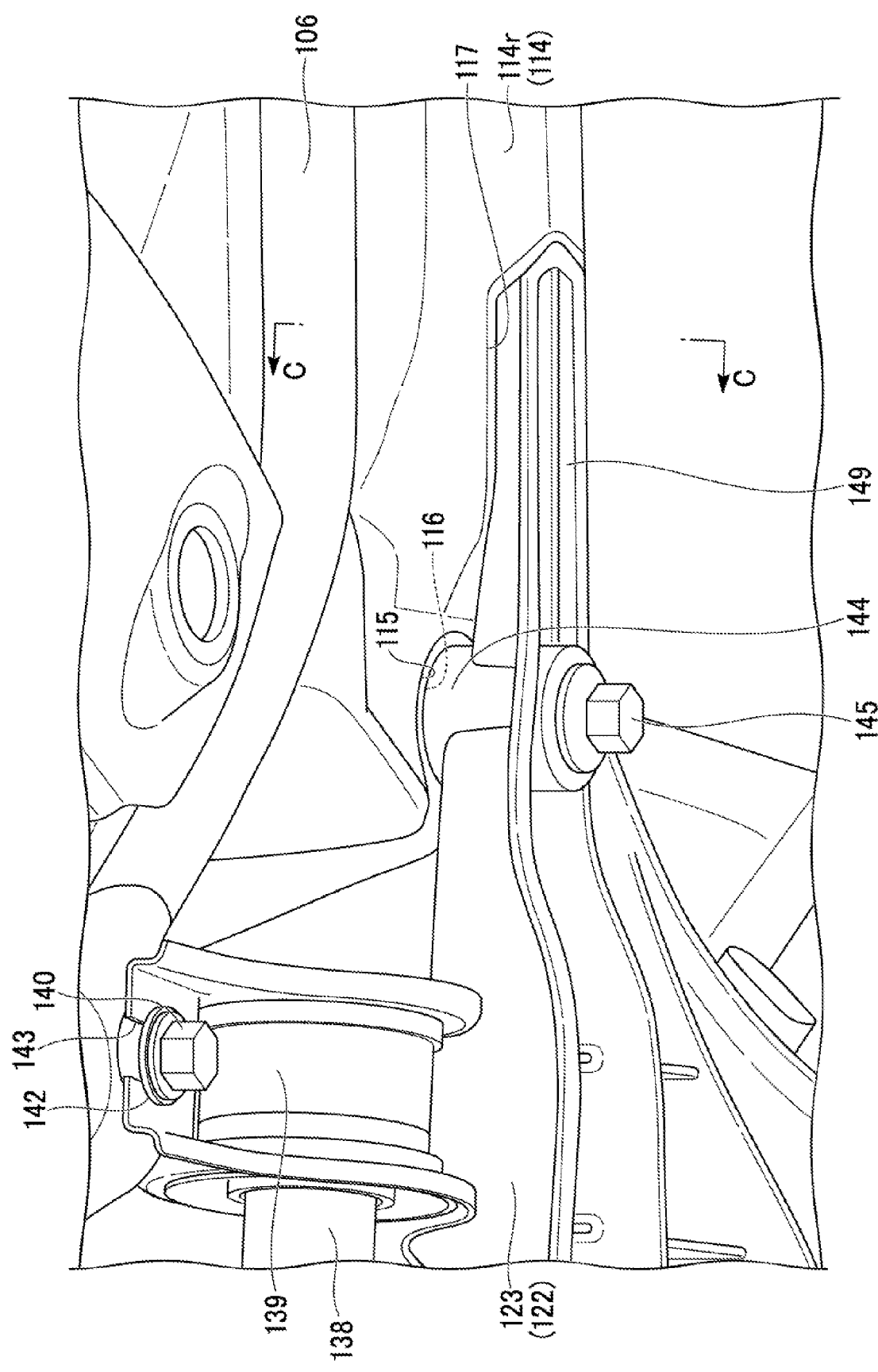
FIG. 33 is a perspective view of the vicinity of a rear end extension portion, seen from the lower side.

Here, in FIG. 31, FIG. 32, and FIG. 33, reference symbol 138 denotes a lower arm, which is a suspension component. The lower arm 138 has its rear end portion supported on the front side frame 107 and the subframe main body 123 via a supporting bracket 139 while being able to swing substantially about the lengthwise axis, and its front end portion is supported via a supporting portion 121 of the subframe main body 123 while being able to swing substantially about the lengthwise axis.

Specifically, the supporting bracket 139 is configured so as to surround a bearing member (not shown in the figure) in a U shape, and a supporting bolt 140 inserted into an insertion hole 142 of the outer side end portion from the lower side, is fastened and fixed in a rear end supporting bracket outer attachment hole 119 (refer to FIG. 22), while the inner side end is fastened and fixed to an attachment portion of the subframe main body 123 with a fixation bolt 141.

Here, in the outer insertion hole 142 of the supporting bracket 139, there is provided a separation cutaway 143 that functions as a separation starting portion, the outer side of which is partially cut away.

As a result, in the case where the extension arms 124 bend downward from the recessed portion 132 serving as a bending starting point, the supporting bracket 139 is separated while leaving the supporting bolt 140, to allow the lower arm 138 to displace downward. Therefore, the size of the separation cutaway 143 is determined to correspond to the load that is applied when the subframe 122 is bent.

As shown in FIG. 33, on both sides of the rear portion of the subframe main body 123, there is provided a fastening portion 144 for the subframe rear end attachment seat 115 of the front end extension portion 114 of the floor center frame 113, which is connected to the front portion of the front floor panel 101, that is, the front floor panel 101. This fastening portion 144 is a cylindrical portion, and a fastening bolt 145 is inserted from the lower side into this fastening portion 144 to be fastened and fixed in a bolt hole 116 (refer to FIG. 22 and FIG. 35) provided in the subframe rear end attachment seat 115.

Figure 34:
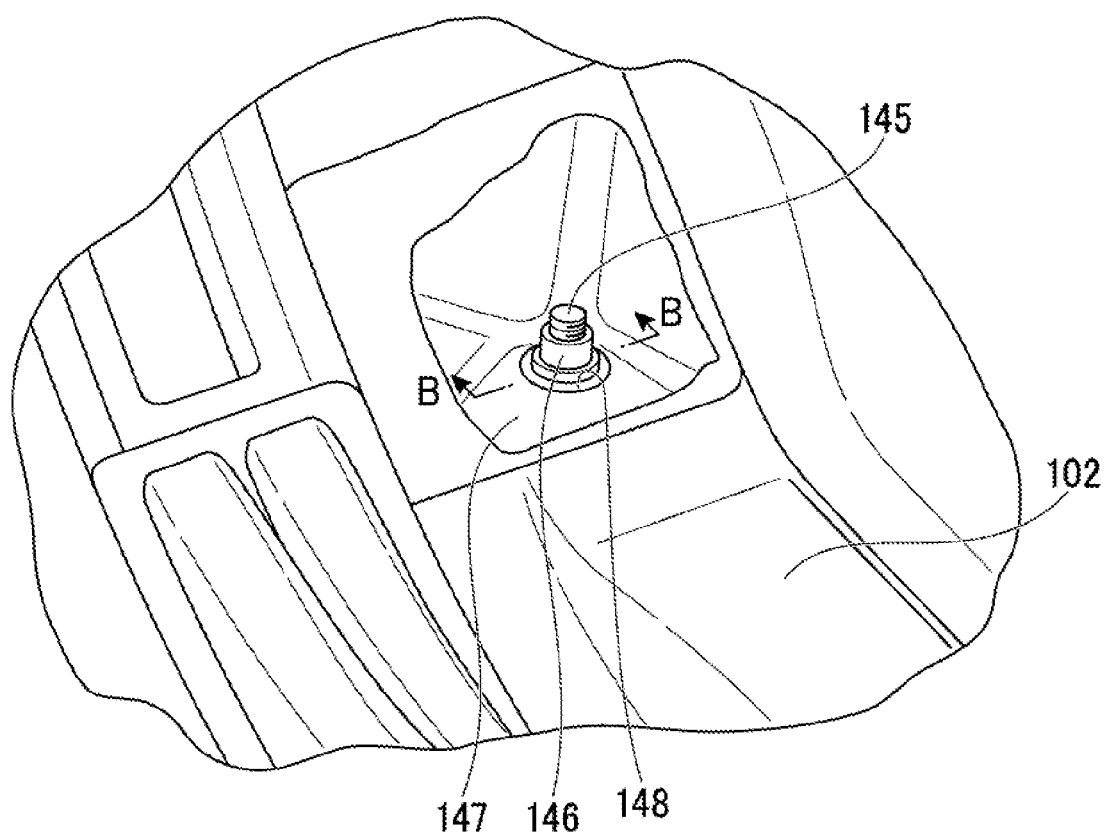
FIG. 34 is a partially cutaway perspective view of a fastening portion seen from the vehicle cabin interior.
Figure 35:
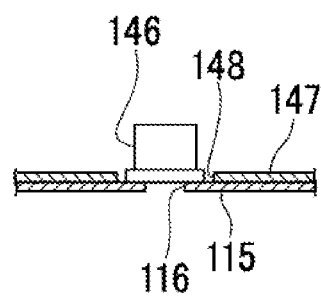
FIG. 35 is a sectional view taken along line B-B of FIG. 34.

FIG. 34 is a partially cutaway perspective view of the fastening portion 144 seen from the vehicle cabin interior. FIG. 35 is a sectional view taken along line B-B of FIG. 34 (excluding the fastening bolt 145). As shown in FIG. 34 and FIG. 35, the fastening bolt 145 inserted into the fastening portion 144 is fastened to a weld nut 146 which is welded to the back side of the subframe rear end attachment seat 115. In the periphery of this weld nut 146 there is welded and fixed in an overlapping manner, a reinforcing plate 147 that surrounds the weld nut 146 with a diameter greater than the outer dimension of this weld nut 146.

That is to say, in the reinforcing plate 147, there is formed a hole 148 so as to be away from the periphery of the weld nut 146. For this reason, although the reinforcing plate 147 reinforces the periphery of the subframe rear end attachment seat 115, the portion with the weld nut 146 attached thereon is not reinforced. As a result, when the fastening bolt 145 receives a downward pulling force, the fastening bolt 145 breaks the subframe rear end attachment seat 115 along with the weld nut 146 to allow it to be easily pulled out.

Figure 37:
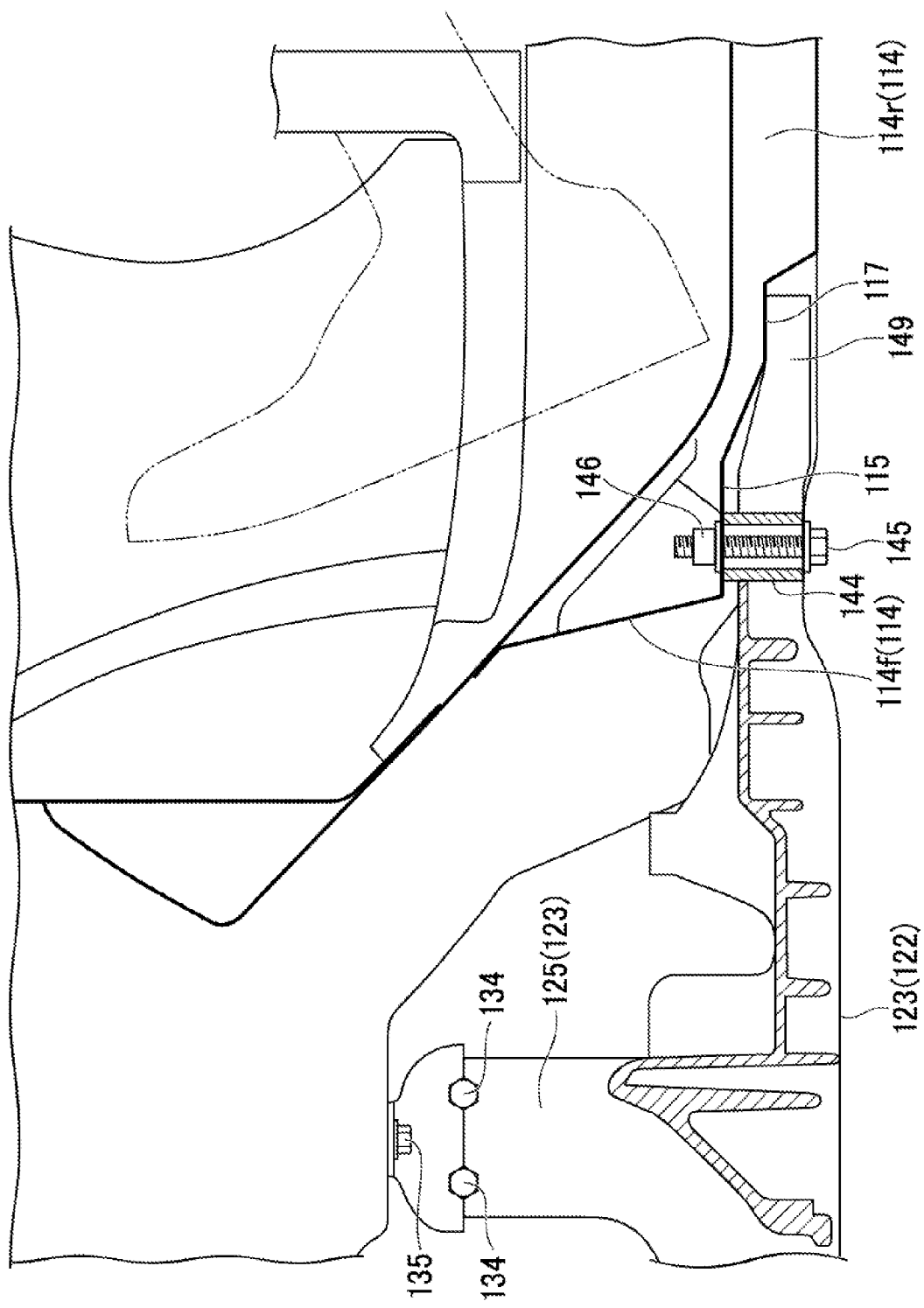
FIG. 37 is a side sectional view of a rear attachment portion of a subframe main body.

FIG. 36 is a sectional view taken along line C-C of FIG. 33, and FIG. 37 is a side sectional view of the rear attachment portion of the subframe main body 123. In the fastening portion 144 of the subframe main body 123, a rear end extension portion 149 is formed to extend backward within a range between the fastening portion 144 and the position in the vicinity of the heels of a passenger in the driving posture (refer to FIG. 37). This rear end extension portion 149 is to be accommodated within the recess portion 117 provided on the front side of the front joint portion 114f of the front end extension portion 114.

As shown in FIG. 36, the dashboard panel 102 is such that on both sides of the front tunnel portion 103, there is formed a protrusion portion 150 that is slightly lower than the peak portion but one step higher than the flat portion 151. The front end extension portion 114 of the floor center frame 113 is joined to the back side of this protrusion portion 150; the rear portion 117 formed on the front side of the rear portion 114r of this front end extension portion 114 accommodates the rear end extension portion 149 of the subframe main body 123; and these front end extension portion 114 and the rear end extension portion 149 do not project to the lower side of the flat portion 151 of the dashboard panel 102.

Here, the rear end extension portion 149 of the subframe main body 123 has strength and rigidity greater than or equal to that of the portion of the subframe 122 in the rear of the recessed portion 132, that is, the rear end attachment portion 127 of the extension arm 124 and the subframe main body 123. In this embodiment, the rear end extension portion 149 has vertical ribs similar to those provided on the lower surface of the subframe main body 123 to gain a required level of bending rigidity (refer to FIG. 36).

According to the above embodiment, when an impact load is applied in the event of a vehicle frontal collision, this frontal collision load is distributed to the floor center frames 113, which have a high level of strength and rigidity, from the pair of extension arms 124, 124 that are arranged so as to broaden with approach to the front side, via the subframe main body 123.

Figure 38:
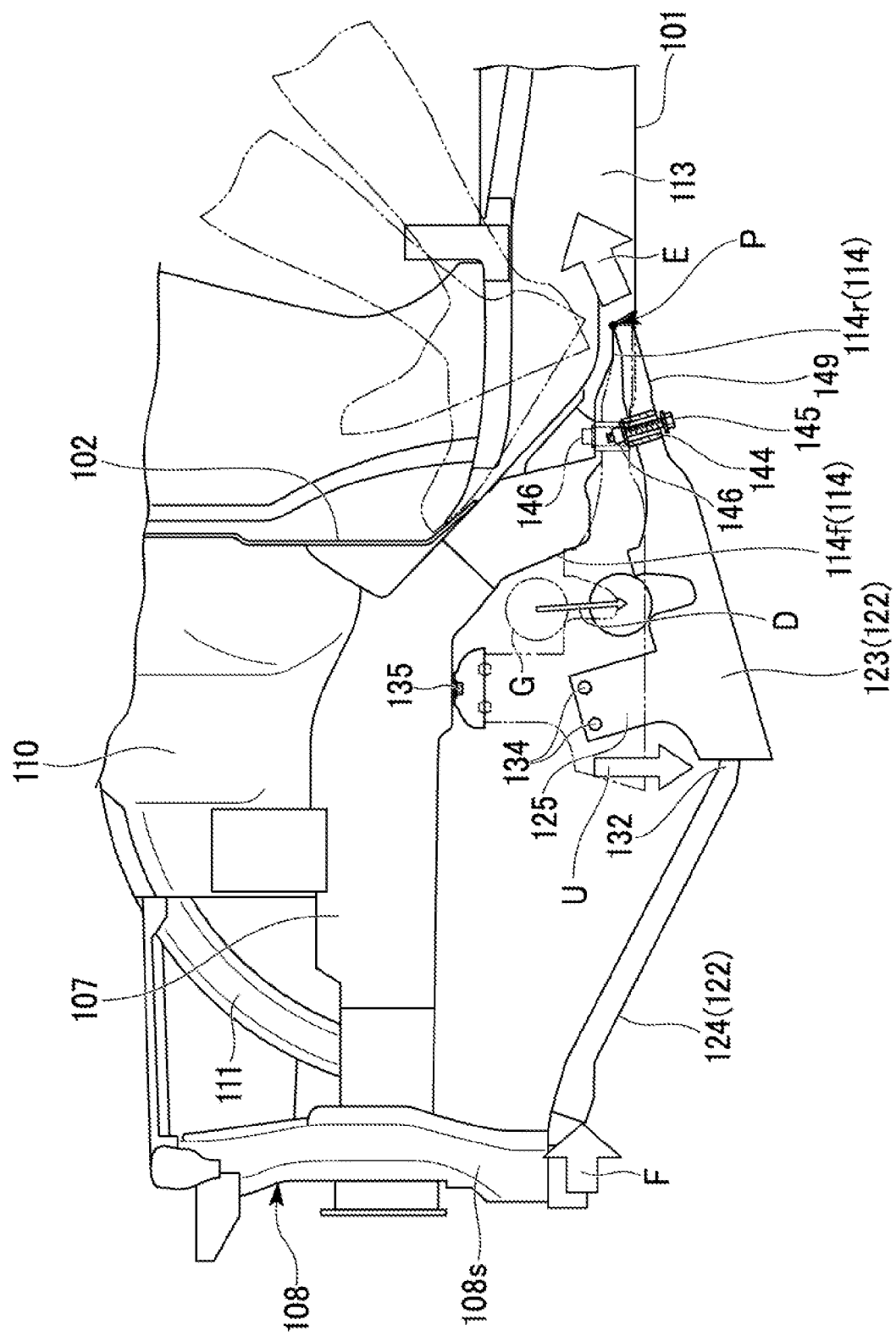
FIG. 38 is a side explanatory view showing a collisional state.

Here, when a frontal collision load (arrow F) above a certain level is applied and a backward load is applied to the lower portion of the front bulkhead 108 as shown in FIG. 38, the extension arm 124 of the subframe 122 bends downward at the recessed portion 132, and a load is applied in a manner such that the fastening portion 144 of the rear end portion of the subframe main body 123 is pulled out downward (arrow U) about the rear end of the rear end extension portion 149 of the subframe main body 123 of the subframe 122, being the center P.

This load (arrow U) is applied so that the fastening bolt 145 fixing the fastening portion 144 breaks the subframe rear end attachment seat 115 in the periphery of the weld nut 146 via the weld nut 146 and is pulled out downward. Therefore, the collision energy is absorbed when the periphery of the weld nut 146 breaks, and at the same time, it is possible to prevent upward deformation in the subframe rear end attachment seat 115, the front floor panel 101 therearound, and the flat portion of the dashboard panel 102.

Therefore, since the structure uses a frontal collision load to pull out the fastening bolt 145, it operates reliably at an appropriate timing without the need for measuring timing, unlike the case of using an explosive.

Moreover, since the extension arm 124 starts to bend downward at the recessed portion 132, the electric power steering device EPS supported on the subframe 122 is displaced downward (arrow D). As a result, particularly the steering gear box G of the electric power steering device EPS located in the vicinity of passenger's feet, can be retracted to the outside of the crash stroke range in the lengthwise direction of the front side frames 107, that is to say, it can be retracted to the lower side, and it is possible to ensure a large deformation stroke for the vehicle body and sufficiently absorb collision energy.

Accordingly, even if a force is applied so that the dashboard panel 102 in the vicinity of the feet of the passenger is pressed by the rear end extension portion 149 of the subframe main body 123 and is then deformed upward (arrow E), the deformation is limited to merely a protrusion in the vicinity of the heel of the passenger. Therefore, unlike those cases where the area in the vicinity of the toes of the passenger is pressed, the front floor panel 101 deforms in a direction of the angle of the passenger's ankle increasing, and the level of injury to the passenger can be minimized as a result. In FIG. 38, the rear side shows a passenger foot position prior to a collision and the front side shows a passenger foot position after a collision.

Here, since the highly rigid subframe main body 123 supports the lower arm 138 and so forth, which are suspension components, reinforcement for them is no longer required, and it is possible to suppress an increase in the overall weight of the subframe.

Moreover, since the rear end of the rear end extension portion 149 of the subframe main body 123 can be supported on the front end extension portion 114 of the highly rigid floor center frame 113, the length of the subframe 122 on the rear side of the recessed portion 132 of the extension arms 124 can be made long, and the steering gear box G of the electric power steering device EPS, which is supported on the subframe 122 in the vicinity of the dashboard panel 102, can be greatly retracted downward. As a result, the crash stroke of the front side frames 107 is ensured, and the level of collision energy absorption achieved by the bending of the front side frames 107 will not be reduced.

The portion of the front end extension portion 114 of the floor center frame 113 to be deformed can be adjusted by setting the length and the recess portion 117 of the front end extension portion 114 of the floor center frame 113 that receives the rear end extension portion 149 of the subframe main body 123. Therefore, setting can be easily performed. Furthermore, the upper protrusion position of the front floor panel 101 or the dashboard panel 102 in the vicinity of passenger's feet can be set to a position where the level of influence on the passenger is low.

Since the recessed portion 132 of the extension arms 124 is formed at a position lower than the front end attachment portion 129 of the extension arms 124, the front end attachment portion 129 of the extension arms 124 is positioned higher than the recessed portion 132. As a result, the recessed portion of the extension arms 124 can be made likely to bend downward.

The rear end extension portion 149 of the subframe main body 123 has a level of strength and rigidity greater than or equal to that of the portion of the subframe 122 on the rear side of the recessed portion 132. Therefore, the subframe main body 123 can reliably rotate about the rear end of the rear end extension portion 149, which serves as the center P, and the fastening bolt 145 can be pulled out without the rear end extension portion 149 of the subframe main body 123 deforming.

Since the periphery of the fastening bolt 145 is reinforced with the reinforcing plate 147, supporting rigidity of the subframe main body 123 can be improved, and since the reinforcing plate 147 does not reinforce the weld nut 146 with the hole 148, which is larger than the weld nut 146 fastening the fastening bolt 145, separation of the fastening bolt 145 can be easily performed.

Since the recessed portion 132 is formed in the extension arm 124 and the upper attachment arm portion 125 is provided on the subframe main body 123, which is attached to the rear end portion of the extension arm 124, the upper attachment arm portion 125 is positioned in the rear of the recessed portion 132. As a result, the vehicle front-end portion can be made shorter and the vehicle body can be made smaller. Moreover, since the separation cutaway 137 is provided in the bolt insertion hole 136 for the fixation bolt 134 of the connecting bracket 133 fixed to the upper attachment arm portion 125 with the fixation bolt 134, when a downward load above a certain level is applied to the upper attachment arm portion 125, the bolt insertion hole 136 breaks at the separation cutaway 137, and the upper attachment arm portion 125 can be displaced downward while leaving the connecting bracket 133. As a result, the operation of the subframe main body 123, that is, the subframe 122 rotating about the rear end of the rear end extension portion 149 serving as the supporting point, will not be obstructed.

In the case where the upper attachment arm portion 125 is displaced downward due to the separation cutaway 137, since a separation cutaway 143 is provided also in the insertion hole 142 of the supporting bolt 140 for the supporting bracket 139 of the lower arm 138, the supporting bracket 139 of the lower arm 138 can be displaced downward similar to the subframe main body 123, and it will not obstruct the movement of the subframe main body 123.

The present invention is not limited to the above embodiments, and for example, a rivet may be used instead of the fastening bolt 145. Moreover, the subframe 122 has been described as a structure of being supported at the front end, the rear end, and the lengthwise center portion. However, it may be supported at least at the front end and the rear end. As for the recessed portion 132, as long as the sectional plane is reduced, the sectional plane of either the upper member 124*au* or the lower member 124*a*1 may be reduced. Here, by adjusting the sectional plane reduction, setting of initial load of bending can be freely adjusted.

DESCRIPTION OF REFERENCE SYMBOLS

7 Front side frame
1 Front floor panel (vehicle body floor)

2 Dashboard panel (vehicle body floor)
38 Lower arm (suspension component)
52 Stabilizer (suspension component)
EPS Electric power steering device (in-vehicle component, power steering device)
22 Subframe
29 Front end attachment portion (front end portion)
44 Fastening portion (rear end portion)
23 Subframe main body
24 Extension arm
32 Recessed portion (weakened starting portion)
25 Upper attachment arm portion (intermediate fastening portion)
33 Connecting bracket
34 Fixation bolt (fastener)
36 Bolt insertion hole (intermediate fastening portion insertion hole)
37 Separation cutaway
53 Insertion recess portion
G Steering gear box (in-vehicle component)
54 Opening portion
13 Floor center frame
26 Fastening bolt (fastener)
38 Lower arm
21 Supporting portion (front end supporting portion)
8 Front bulkhead
107 Front side frame
101 Front floor panel (vehicle body floor)
102 Dashboard panel (vehicle body floor)
138 Lower arm (suspension component)
122 Subframe
129 Front end attachment portion (front end portion)
144 Fastening portion (rear end portion)
132 Recessed portion (weakened starting portion)
149 Rear end extension portion
103 Floor tunnel portion
113 Floor center frame
114 Front end extension portion
125 Upper attachment arm portion (intermediate fastening portion)
137 Separation cutaway (separation starting portion)

The invention claimed is:

1. A front-end structure for a vehicle wherein: a subframe, which is provided across front side frames arranged along a vehicle lengthwise direction in left and right of a vehicle front-end portion and a vehicle body floor front portion to support a suspension component and an in-vehicle component, is supported at least at a front end portion and at a rear end portion of the subframe;
the subframe is provided with a subframe main body and at least one extension arm that extends forward of a front end portion of the subframe main body; and
at a rear portion of the at least one extension arm and near the subframe main body, there is provided a weakened starting portion that serves as a point at which downward bending starts midway along the lengthwise direction of the subframe with an input load in an event of a vehicle frontal collision, wherein:
on the rear end portion of the subframe, there is provided a fastening portion for attaching to the front portion of the vehicle body floor, and a rear end extension portion extends backward from the fastening portion to a position configured and arranged to be near the heels of a vehicle operator in a driving posture during vehicle operation,
there is provided a front bulkhead that is attached to front end portions of the left and right front side frames,
the subframe extension arm includes an extension arm main body, a rear end attachment portion provided on a rear end portion of the extension arm main body, and a front end attachment portion provided on a front end portion of the extension arm main body,
the rear end attachment portion of the at least one extension arm is fixed to the subframe main body,
the front end attachment portion of the at least one extension arm is fixed to the front bulkhead, and
the weakened starting portion is formed at the rear end portion of the extension arm main body.

2. The front-end structure for a vehicle according to claim 1, wherein the subframe main body, in the front end portion thereof, has an intermediate fastening portion that is operatively attached to at least one of the front side frames with a fastener; and in either one of a portion of the front side frame immediately surrounding an intermediate fastening portion insertion hole for receiving the fastener, or a portion of the intermediate fastening portion immediately surrounding an insertion hole for receiving the fastener, there is provided a separation cutaway portion that is configured to break and to allow the subframe to move downward in relation to the side frames when the subframe receives a downward load during said vehicle frontal collision.

3. The front-end structure for a vehicle according to claim 1, wherein:
the subframe main body is formed in a trapezoidal shape;
said at least one extension arm comprises a pair of left and right extension arms arranged in a non-parallel configuration so as to increase the width therebetween with approach to the front side; and the rear end portion of the subframe main body is connected to a floor center frame that is attached to the vehicle body floor.

4. The front-end structure for a vehicle according to claim 1, wherein the rear end portion of the extension arm is fixed to the subframe main body by three fasteners that are inserted in the vertical direction and are arranged in a triangular shape.

5. The front-end structure for a vehicle according to claim 1, wherein the tip end of the at least one extension arm is connected to a lower corner portion of the front bulkhead.

6. The front-end structure for a vehicle according to claim 1, wherein a floor tunnel portion is formed in a vehicle widthwise center portion of the vehicle body floor, and there is provided a floor center frame that extends along the lengthwise direction on each side of this floor tunnel portion; a front end extension portion is provided on the front end portion of each floor center frame; the fastening portion of the subframe is fixed to the front end extension portion of the floor center frame; and in front of the front end extension portion there is arranged an in-vehicle component to be supported on the subframe.

7. The front-end structure for a vehicle according to claim 1, wherein the front end extension portion of the floor center frame is provided with a recess portion that receives the rear end extension portion of the subframe.

8. The front-end structure for a vehicle according to claim 1, wherein the front end portion of the subframe is positioned higher than the weakened starting portion of the subframe.

9. The front-end structure for a vehicle according to claim 1, wherein the rear end extension portion of the subframe has strength and rigidity greater than or equal to that of the portion of the subframe at the rear of the weakened starting portion.

10. The front-end structure for a vehicle according to claim 1, wherein a periphery of the fastening portion of the subframe is reinforced.

11. The front-end structure for a vehicle according to claim 1, wherein the subframe, in a portion at the rear of the weakened starting portion, has an intermediate fastening portion that fastens to the front side frame; and in the intermediate fastening portion there is provided a separation starting portion that is configured to be separated when a downward load is received.

12. The front-end structure for a vehicle according to claim 1, wherein the subframe main body includes two upper arm attachment portions for attaching the subframe to the side frames, and further comprising a pair of connecting brackets, with one of said connecting brackets interposed between an outer end of each of the upper arm attachment portions and one of the side frames at a position to the rear of the weakened starting portion, wherein each of said connecting brackets comprises a substantially vertically extending portion having a separation starting portion formed therein that is configured to permit separation of the subframe from the side frames when a downward load is received during said vehicle frontal collision.

13. A front-end structure for a vehicle wherein: a subframe, which is provided across front side frames arranged along a vehicle lengthwise direction in left and right of a vehicle front-end portion and a vehicle body floor front portion to support a suspension component and an in-vehicle component, is supported at least at a front end portion and at a rear end portion of the subframe;

the subframe is provided with a subframe main body that is formed from a light alloy casting and that supports the suspension component and the in-vehicle component at a rear portion thereof, and a pair of left and right extension arms that are fixed to, and extend forward of the subframe main body, and that are formed from a light alloy or steel by press molding;

at a rear portion of the extension arms and near the subframe main body, there is provided a weakened starting portion that serves as a point at which downward bending starts midway along the lengthwise direction of the subframe with an input load in an event of a vehicle frontal collision, and wherein in an upper surface of the subframe main body, between an intermediate fastening portion and the rear end portion of the subframe main body, there is formed an insertion recess portion into which a stabilizer serving as the suspension component is to be inserted in the vehicle widthwise direction; on an upper portion of the subframe main body, there is fixed a power steering device; and a steering gear box of the power steering device is provided at a position that blocks an opening portion of the insertion recess portion.

14. A front-end structure for a vehicle wherein: a subframe, which is provided across front side frames arranged along a vehicle lengthwise direction in left and right of a vehicle front-end portion and a vehicle body floor front portion to support a suspension component and an in-vehicle component, is supported at least at a front end portion and at a rear end portion of the subframe;

the subframe is provided with a subframe main body that is formed from a light alloy casting and that supports the suspension component and the in-vehicle component at a rear portion thereof, and a pair of left and right extension arms that are fixed to, and extend forward of the subframe main body, and that are formed from a light alloy or steel by press molding; and at a rear portion of each of the extension arms and near the subframe main body, there is provided a weakened starting portion that serves as a point at which downward bending starts midway along the lengthwise direction of the subframe with an input load in an event of a vehicle frontal collision;

wherein the rear end portion of each of the extension arms is configured so as to sandwich a front-end supporting portion of a lower arm provided on the front end portion of the subframe main body; and a portion of each of the extension arms extends forward along a bottom surface of the subframe main body.

* * * * *